US008595018B2

(12) United States Patent
Kampmann et al.

(10) Patent No.: US 8,595,018 B2
(45) Date of Patent: Nov. 26, 2013

(54) TECHNIQUE FOR CONTROLLING CODEC SELECTION ALONG A COMPLEX CALL PATH

(75) Inventors: Dirk Kampmann, Vaals (NL); Andreas Witzel, Herzogenrath (DE); Karl Hellwig, Wonfurt (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 923 days.

(21) Appl. No.: 12/523,671

(22) PCT Filed: Jan. 18, 2007

(86) PCT No.: PCT/EP2007/000427
§ 371 (c)(1),
(2), (4) Date: Jul. 17, 2009

(87) PCT Pub. No.: WO2008/086825
PCT Pub. Date: Jul. 24, 2008

(65) Prior Publication Data
US 2010/0070286 A1    Mar. 18, 2010

(51) Int. Cl.
*G10L 19/00* (2013.01)
(52) U.S. Cl.
USPC ........... 704/500; 704/227; 704/219; 704/212; 704/210; 709/232; 455/67.11; 455/567; 455/462; 455/445; 455/126; 375/324; 370/468; 370/465; 370/384; 370/352; 370/254; 370/217; 342/51
(58) Field of Classification Search
USPC .......... 704/500, 227, 219, 212, 210; 709/232; 455/67.11, 567, 462, 445, 126; 375/324; 370/503, 468, 465, 384, 352, 370/254, 217; 342/51
See application file for complete search history.

(56) References Cited

U.S. PATENT DOCUMENTS

| 4,039,760 | A | * | 8/1977 | Gregory et al. | 455/462 |
|---|---|---|---|---|---|
| 4,495,614 | A | * | 1/1985 | Aro et al. | 370/384 |
| 4,513,414 | A | * | 4/1985 | Knapke et al. | 370/217 |
| 4,519,071 | A | * | 5/1985 | Miller | 370/503 |
| 4,641,323 | A | * | 2/1987 | Tsang | 375/324 |

(Continued)

FOREIGN PATENT DOCUMENTS

WO    WO 2004/075582 A    9/2004

OTHER PUBLICATIONS

Universal Mobile Telecommunications System (UMTS); Out of band transcoder control; Stage 2 (3GPP 23.153 Out of Band Transcoder Control). ETSI TS 123 153 V6.3.0 (Sep. 2005).

(Continued)

*Primary Examiner* — Michael Colucci

(57) ABSTRACT

The invention relates to a technique of operating a call control node controlling at least one section of a call path. The call path includes between two opposite edge nodes a multi-section harmonization path along which codec selection is to be harmonized. A method embodiment of the technique, wherein the call control node is a transfer node in the harmonization path between the edge nodes, comprises the steps of determining if the call control node is a transfer node of the harmonization path; determining if a codec used for the at least one section controlled by the call control node fulfills a predefined harmonization criterion; and providing, in case the used codec does not fulfill the harmonization criterion, a harmonization trigger indication to at least one of the edge nodes of the harmonization path for initiating harmonization.

26 Claims, 16 Drawing Sheets

(56) References Cited

U.S. PATENT DOCUMENTS

| | | | |
|---|---|---|---|
| 4,656,478 A * | 4/1987 | Leuenberger | 342/51 |
| 6,119,022 A * | 9/2000 | Osborn et al. | 455/567 |
| 6,832,088 B1 * | 12/2004 | Stumpert | 455/445 |
| 7,546,376 B2 * | 6/2009 | Widegren et al. | 709/232 |
| 7,596,491 B1 * | 9/2009 | Stachurski | 704/219 |
| 8,135,362 B2 * | 3/2012 | LaDue | 455/126 |
| 8,374,852 B2 * | 2/2013 | Murashima | 704/210 |
| 2002/0007269 A1 * | 1/2002 | Gao | 704/212 |
| 2004/0185785 A1 * | 9/2004 | Mir et al. | 455/67.11 |
| 2005/0091047 A1 * | 4/2005 | Gibbs et al. | 704/219 |
| 2005/0137864 A1 * | 6/2005 | Valve et al. | 704/227 |
| 2005/0180456 A1 * | 8/2005 | Bultinck et al. | 370/465 |
| 2006/0221941 A1 * | 10/2006 | Kishinsky et al. | 370/352 |
| 2007/0121673 A1 * | 5/2007 | Hammer | 370/468 |
| 2007/0171841 A1 * | 7/2007 | Witzel et al. | 370/254 |
| 2010/0223053 A1 * | 9/2010 | Sandgren et al. | 704/219 |

OTHER PUBLICATIONS

Digital cellular telecommunications system (Phase 2+); Universal Mobile Telecommunications System (UMTS); Inband Tandem Free Operation (TFO) of speech codecs; Service description; Stage 3 (3GPP 28.062 Tandem Free Operation). ETSI TS 128 062 V6.2.0 (Dec. 2005).

Handley, et al: "SDP: Session Description Protocol". Network Working Group, Request for Comments: 2327. Apr. 1998.

* cited by examiner

TECHNIQUE FOR CONTROLLING CODEC SELECTION ALONG A COMPLEX CALL PATH

FIELD OF THE INVENTION

The invention generally relates to the field of transcoding content data in communication networks such as, for example, mobile networks. More specifically, the invention relates to a technique of controlling a selection of codecs along a call path in which different codec establishment procedures are performed.

BACKGROUND OF THE INVENTION

Mobile-to-Mobile calls (MMCs) typically require that a speech signal is digitally encoded in the originating mobile user device, sent over a first interface, transcoded into PCM (Pulse Code Modulation) encoded speech by a first transcoder unit in a mobile network, carried over the mobile network, transcoded again by a second transcoder unit, sent over a second air interface and is finally decoded in the terminating mobile user device. A similar situation arises for MOCs (Mobile Originating Calls) or MTCs (Mobile Terminating Calls), in which the call path includes a gateway node connected to a PSTN (Public Switched Telecommunications Network). Call paths comprising a higher number of transcoding steps frequently occur, for example in case the call path extends over several PLMNs (Public Land Mobile Networks). Besides speech, also other content data may be subjected to transcoding, for example video data.

Regarding speech, a common speech codec (the term "codec" refers to a coding-decoding mechanism for performing encoding and decoding on a digital data stream) has to be established between each pair of transcoder units along the call path. An explicit establishment procedure may be omitted only in case both transcoder units intend to establish a default codec, for example the PCM G.711 codec. In general, the number of transcoding steps in a call path should be minimized to maintain a high speech quality and to reduce transcoding costs.

An example of a procedure in this respect is the Tandem-Free Operation (TFO) as defined by the 3GPP ($3^{rd}$ Generation Partnership Project) in its TS (Technical Specification) 28.062, which specifies a codec establishment procedure that avoids transcoding between two peering transcoder units in case the speech codecs used upstream and downstream of the two TFO partners are at least compatible (or even identical) to each other. A TFO protocol provides for an in-band signalling mechanism between the two transcoder units. In case the TFO protocol ended in TFO state OPERATION, each transcoder unit receives speech frames and forwards them without a transcoding step to the TFO partner. TFO works purely in-band in a PCM link, i.e. after the call path has been established.

Another example of a codec establishment procedure that avoids unnecessary transcoding steps is Out-Of-Band Transcoder Control (OoBTC) as defined in the 3GPP TS 23.153. OoBTC provides a mechanism that uses an out-of-band codec negotiation procedure between the call control nodes which control transcoder units along the call path for negotiating common codecs for the section of the call path controlled by the control nodes. In case of successful negotiation (e.g., a common codec has been found), no transcoder unit is included in this section of the call path. For signalling codec information, for example the BICC (Bearer Independent Call Control) protocol specified in the 3GPP TS 32.205 or the SIP (Session Initiation Protocol) as defined by the IETF (Internet Engineering Task Force) in RFC (Request For Comment) 3261 may be used.

OoBTC is used before call setup and attempts to establish a Transcoder Free Operation (TrFO). If OoBTC fails to establish a TrFO (e.g., only the default codec PCM has been agreed upon), then the in-band TFO mechanism may be tried after call-setup. In case TFO can be established, the call path will include the transcoder units, but the transcoder units do not perform any transcoding operations. Therefore, a call path extending over a core network of one or more mobile networks may consist of sections including transcoding free links (TrFL), of sections including tandem-free links (TFOL) and of further sections, in which neither TFO nor TrFO is in operation.

The above-described codec establishment procedures act locally in a section of the call path to minimize the number of transcoding steps, i.e. codec optimization is performed basically between peering units (TFO) or along a section of the call path in which the same codec negotiation procedure is used (OoBTC, TrFO). A call path section is defined herein as designating a part of a call path along which the usage of a particular codec establishment procedure has established a specific codec.

Performing individual codec establishment procedures along different call path sections may lead to establishment of locally optimal codecs. However, no globally optimal codec (or codec combination) may be found for the call path as a whole. As an example, the interaction of different codec establishment procedures (e.g., OoBTC before call setup and TFO after call setup) may lead to the drop of codec-related information or to an incorrect or incomplete transmission of such codec information.

Further, the interaction between OoBTC and TFO after call establishment may lead to a couple of codec type modifications along at least some of the sections of the call path. However, each codec modification after call establishment impacts the speech quality due to interruptions and change of transcodings. Further, it is not guaranteed that intermediate states during the codec modification procedures result in better speech quality. Still further, it is not guaranteed that this interaction results in a stable codec selection (or codec combination) at all, but the interaction may result in cyclic changes between at least two speech codecs. This may even lead to the release of the call.

There is a need for a technique allowing the establishment of a codec (or codec combination) along a call path, wherein the selected codec(s) is/are globally optimized in terms of at least one optimization criterion such as speech quality, bandwidth requirements, transcoding resources and similar operator requirements.

SUMMARY OF THE INVENTION

According to a first aspect of the invention, a method of operating a call control node controlling at least one section of a call path is proposed, wherein the call path includes between two opposite edge nodes a multi-section harmonization path along which codec selection is to be harmonized, and wherein the call control node is a transfer node in the harmonization path between the edge nodes. The method comprises the steps of determining if the call control node is a transfer node of the harmonization path; determining if a codec used for the at least one section controlled by the call control node fulfils a predefined harmonization criterion; and providing, in case the used codec does not fulfil the harmonization criterion, a harmonization trigger indication to at least one of the edge nodes of the harmonization path for initiating harmonization.

The call control node may for example be an MSC (Mobile Switching Center) or a TSC (Transit Switching Center) in a mobile network or fixed network. The call control node may control at least one transcoder unit, which may for example be implemented in a MGW (Media Gateway) in an UMTS (Universal Mobile Telecommunication System) network or an IMS (IP Multimedia Subsystem) network. The call control node may control the selection of a codec for the associated section(s) of the call path according to a locally acting codec establishment procedure, for example an OoBTC codec negotiation procedure (aiming for TrFO) or an in-band mechanism (TFO, aiming for tandem free operation) or an SIP/SDP mechanism aiming for transcoding free operation.

The harmonization path may include, as an example, one or more TFO sections and one or more OoBTC sections and/or one or more SIP/SDP sections. The harmonization path may extend along the entire call path in the core network of a mobile network, i.e. from an access-serving call control node to another access-serving call control node (in case of an MMC) or a gateway call control node (in case of a MOC or MTC). On the other hand, the harmonization path may also comprise only a small part of the entire call path. In this case the harmonization path may be limited by call sections along which no signalling information related to harmonization procedures can be forwarded, for example because a protocol used for codec negotiation in this section is not adapted for transporting harmonization signalling information. The harmonization trigger indication may be forwarded to the next node in the harmonization path. The transfer node thus sends its trigger indication towards an unknown edge node.

The step of determining if the call control node is a transfer node may comprise assessing if the call control node controls two sections of the harmonization path. The method may further comprise the step of determining if the call control node is an element of the harmonization path. This step may include determining if the call control node controls at least one section of the harmonization path. As an example, the determination step may comprise the step of determining if the call control node controls at least one TFO section or at least one OoBTC section. The determination steps may be performed on a call-by-call basis. Alternatively, the role of a transfer node may also be assigned independent of a particular call to the call control node, e.g. via administration. The determination steps may be performed sequentially or in parallel. For example, the step of determining if a codec used for the at least one section controlled by the call control node fulfils a predefined harmonization criterion may be performed before the step of determining if the call control node is a transfer node of the harmonization path.

The predefined harmonization criterion may relate to one or more objectives of a network operator. Thus, the step of determining if a selected codec fulfils the predefined harmonization criterion may include the step of comparing the momentarily selected codec with a table of available codecs, wherein the codecs may be prioritized according to the objectives of the network operator. For example, the codecs may be sorted according to at least one of the criteria speech quality and bandwidth consumption.

The harmonization trigger indication may be included in a message which is transmitted towards one or both of the edge nodes of the harmonization path. In one mode of the invention, the harmonization trigger indication is transmitted to the next node in the harmonization path. In other words, the indication is sent node-by-node along the harmonization path towards the edge node(s).

One representation of the invention may comprise the further steps of receiving a harmonization trigger indication from another transfer node in the harmonization path; and forwarding the received harmonization trigger indication further along the harmonization path. In this case, another transfer node has determined that a harmonization is required and has generated and transmitted a harmonization trigger indication. Each of the further transfer nodes in the harmonization path may forward a harmonization trigger indication without taking further action.

The method may comprise the further steps of receiving a supported codec list (SCL); modifying the supported codec list by removing a codec indication from the supported codec list in case the indicated codec is not supported by the call control node; and forwarding the modified supported codec list. The SCL may be included in a harmonization information message, which is forwarded along the harmonization path. When arriving at an edge node (i.e. having passed all transfer nodes of the harmonization path), the supported codec list thus indicates only those codecs which are supported by the edge node from which the SCL originates and all intermediate transfer nodes, which have forwarded and possibly filtered the SCL.

In a variant of the invention, the method comprises the further steps of receiving a selected codec indication; and changing, in case a codec used in the at least one section controlled by the call control node is not at least compatible with the indicated codec, the used codec to the indicated codec. The selected codec indication may be included in a harmonization decision message, which originates from one of the edge nodes of the harmonization path, which has decided on a codec (or codec combination) for the harmonization path. The selected codec indication may be forwarded further along the harmonization path.

According to one configuration, the harmonization criterion may not be fulfilled when the codec used in a first of the sections controlled by the call control node is not compatible with a codec used in a second of the sections controlled by the call control node. In one example, the call control node controls two codec negotiation sections, wherein the codec used in a first of the codec negotiation sections is incompatible with the codec used in the second of the codec negotiation sections. In that case, the call control node may trigger the harmonization procedure.

The step of determining if a used codec fulfils the harmonization criterion may include determining if a transcoder free operation (TrFO) or a tandem free operation (TFO) has been established in the at least one section controlled by the call control node. For example, in case TFO has not been established along a PCM section because of incompatible codecs, the call control node may decide to trigger the harmonization procedure by constructing the harmonization trigger indication and providing the indication to one or both of the edge nodes of the harmonization path. As another example, the harmonization procedure may also be triggered in case the call control node controls at least two codec negotiation sections (TrFO) and incompatible codecs have been negotiated in the sections. A harmonization trigger indication may also be provided in case an edge node is an access-serving node and determines that a codec used in the controlled section of the harmonization path is incompatible with a codec used at the radio access.

In one implementation of the invention, the call control node controls (e.g. via OoBTC and/or SIP/SDP) codec negotiation in a first section in a call control layer and controls (e.g. via TFO) codec negotiation in a second section in a user plane layer (e.g. by in-band signalling). The method may then comprise the further step of passing at least one of the harmonization trigger indication, the supported codec list, the selected codec indication and an available codec list between call control layer and user plane layer. This step may, for example, comprise extracting an SCL or a selected codec indication from a message belonging to the control plane and transfering the SCL or the selected codec indication to a MGW controlled by the call control node along with control information indicating that the SCL or the selected codec indication is to be forwarded along a TFO section in the user plane.

According to a second aspect of the invention, a method of operating a call control node controlling at least one section of a call path is provided, wherein the call path includes between two opposite edge nodes a multi-section harmonization path along which codec selection is to be harmonized, and wherein the call control node is one of the edge nodes of the harmonization path. The method comprises the steps of determining if the call control node is an edge node of the harmonization path; receiving a harmonization trigger indication; and transmitting, in response to the received harmonization trigger indication and in case the call control node is an edge to node, a supported codec list towards an opposite edge node of the harmonization path.

The step of determining if the call control node is an edge node may comprise assessing if the call control node controls exactly one section of the harmonization path. The call control node may for example determine that it is an edge node in case it controls exactly one codec negotiation section (e.g. OoBTC or SIP) or exactly one TFO section. As another example, the call control node may determine that it controls one OoBTC or SIP link and one TFO link, however, the TFO link is not compatible to the TFO Harmonization Procedure. For instance, a step of determining whether the TFO link is (not) compatible to a TFO negotiation procedure is analysing a SysID received in the TFO protocol from the TFO partner.

In case the call control node controls more than one section of the call path along which a harmonization procedure may be performed, the node may determine that it is a transfer node, not an edge node, of the harmonization path. For example, an MSC controlling GERAN directly has one TFO section towards GERAN and maybe a TrFO section towards the Core Network. It is, however, an edge node of the harmonization path, as along the TFO section towards GERAN, no harmonization may be performed.

The step of determining if the call control node is an edge node may also be performed after the step of receiving a harmonization trigger indication. For example, the reception of the indication may trigger the determination step. The determination step may be performed on a call-by-call basis. Alternatively, the role of an edge node may also be assigned once to the call control node, e.g. via administration.

The harmonization trigger indication may be included in a Harmonization Trigger message. The supported codec list may be transmitted included in a Harmonization Information message. The harmonization trigger indication may originate from a transfer node of the harmonization path according to the first aspect of the invention. The edge node may thus start codec (re-)negotiation on reception of the harmonization trigger indication from an external node, although the edge node itself did not generate a harmonization trigger. Additionally or alternatively, the method may comprise the further steps of determining if a codec used for the at least one section controlled by the call control node fulfils a predefined harmonization criterion; and to providing, in case the selected codec does not fulfil the harmonization criterion, the harmonization trigger indication for initiating harmonization. The transmission of the SCL may thus be triggered, with respect to the edge node, internally and/or externally.

In one representation of this aspect of the invention, the harmonization criterion is not fulfilled when the codec used for the section controlled by the call control node is not compatible with a codec used for a radio access served by the call control node. The edge node may then (internally) trigger the harmonization to achieve harmonization of the codec(s) used in the harmonization path with the codec used over the air interface.

The supported codec list may be transmitted to the next node in the harmonization path. For example, the SCL may be included in a Harmonization Information message, which is received, possibly filtered and then transmitted to the next node in the harmonization path. In other words, the supported codec list may be transmitted node-by-node along the transfer nodes of the harmonization path towards the opposite edge node.

In case the call control node serves a radio access, the method may comprise the further steps of receiving a selected codec indication (which may be embedded in a Harmonization Decision message); changing, in case a codec used in the section of the harmonization path controlled by the call control node is not at least compatible with the codec indicated by the selected codec indication, the codec used in the controlled section of the harmonization path to the codec indicated by the selected codec indication; and/or changing, in case a codec used in the radio access served by the call control node is not at least compatible with the codec indicated by the selected codec indication, the codec used in the radio access to a codec at least compatible to the codec indicated by the selected codec indication. For example, the codec may be changed to the codec which is indicated.

According to a third aspect of the invention, a method of operating a call control node controlling at least one section of a call path is proposed, wherein the call path includes between two opposite edge nodes a multi-section harmonization path along which codec selection is to be harmonized, and wherein the call control node is one of the edge nodes of the harmonization path. The method comprises the steps of determining if the call control node is an edge node of the harmonization path; receiving a supported codec list; selecting, in case the call control node is an edge node, a codec indicated by the supported codec list as the selected codec for the harmonization path; and transmitting a selected codec indication indicative of the selected codec towards the opposite edge node of the harmonization path.

The step of determining if the call control node is an edge node may comprise assessing if the call control node controls exactly one section of the harmonization path. The determination step may be performed on a call-by-call basis. Alternatively, the role of an edge node may also be assigned once to the call control node via administration.

The supported codec list may be included in a Harmonization Information message, which has been transmitted from the opposite edge node and passed on by all transfer nodes of the harmonization path. The edge node according to the third aspect of the invention then terminates the passing of the SCL and decides on the selected codec (or codec combination) for the harmonization path. The selected codec indication may be transmitted to the next node in the harmonization path, i.e. the selected codec indication may be transmitted node-by-node along the harmonization path. The selected codec indication may be embedded in a Harmonization Decision message. The message may also contain an available codec list.

In case the call control node is an edge node and controls a radio interface, a codec pair for the radio access and the harmonization path as indicated by the supported codec list may be selected.

The method may comprise the further step of changing, in case a codec used in the section of the harmonization path controlled by the call control node is not at least compatible with the codec indicated by the selected codec indication, the used codec to the codec indicated by the selected codec indication and/or changing, in case a codec used in a radio access served by the call control node is not at least compatible with the codec indicated by the selected codec indication, the codec used in the radio access to a codec at least compatible to the codec indicated by the selected codec indication. The edge node may thus also decide to accordingly change a codec being used in a section, which is controlled by the node and which does not belong to the harmonization path buffo the call path.

In one or more of the method aspects of the invention, at least one of the harmonization trigger indication, the supported codec list and the selected codec indication (and possibly an available codec list) may be transmitted node-by-node (n-b-n). At least on reception of an n-b-n message, a node may determine its own role in the harmonization path (edge node or transfer node) and process the message content according to the determined role. In the n-b-n scenario, an element of the harmonization path may not know of the role of the neighbouring node(s) or of the address of the edge nodes of the harmonization path. Each call control node communicates only with its neighbouring control node at the opposite end of the controlled section, i.e. a message is forwarded only to the next neighbour in the harmonization path. For example, a transfer node has to forward a received SCL to the next node along the harmonization path. The forwarding node does not need to know if the next node is a transfer node or an edge node, and does not need to know, e.g., the address of the distant edge nodes of the harmonization path.

At least one of the harmonization trigger indication, the supported codec list and the selected codec indication may be transmitted based on a protocol of a codec establishment procedure used for codec establishment in the at least one section of the harmonization path controlled by the call control node. For example, a Harmonization Trigger message, a Harmonization Information message including a supported codec list or a Harmonization Decision message including a selected codec indication may be based on a protocol used for OoBTC. As a concrete example, the SCL may be transported by re-using a message of a codec negotiation protocol used in a codec negotiation section of the harmonization path. A dummy codec indicating a harmonization message may be included in a message constructed according to the re-used protocol. For example, a dummy codec indicating the harmonization trigger indication may be included in a message constructed according to the protocol.

According to a further aspect of the invention, a computer program product is proposed, which comprises program code portions for performing the steps of any of the method aspects discussed herein when the computer program product is executed on one or more computing devices. The computer program product may be stored on a computer readable recording medium, such as a CD-ROM or DVD. The computer program product may alternatively or additionally be provided as a file or file system for download, e.g., via the Internet.

According to another aspect of the invention, a call control node is proposed, which is adapted for controlling at least one section of a call path, wherein the call path includes between two opposite edge nodes a multi-section harmonization path along which codec selection is to be harmonized, and wherein the call control node is a transfer node in the harmonization path between the edge nodes. The call control node comprises a first determination component adapted for determining if the call control node is a transfer node of the harmonization path; a second determination component adapted for determining if a codec used for the at least one section controlled by the call control node fulfils a predefined harmonization criterion; and a trigger component adapted for providing, in case the used codec does not fulfil the harmonization criterion, a harmonization trigger indication towards at least one of the edge nodes of the harmonization path for initiating harmonization.

According to a further aspect of the invention, a call control node is proposed, which is adapted for controlling at least one section of a call path, wherein the call path includes between two opposite edge nodes a multi-section harmonization path along which codec selection is to be harmonized, and wherein the call control node is one of the edge nodes of the harmonization path. The call control node comprises an edge determination component adapted for determining if the call control node is an edge node by assessing if the call control node controls exactly one section of the harmonization path; a reception component adapted for receiving a harmonization trigger indication; and a harmonization information component adapted for transmitting, in response to the received harmonization trigger indication, a supported codec list towards an opposite edge node of the harmonization path.

According to a still further aspect of the invention, a call control node is proposed, which is adapted for controlling at least one section of a call path, wherein the call path includes between two opposite edge nodes a multi-section harmonization path along which codec selection is to be harmonized, and wherein the call control node is one of the edge nodes of the harmonization path. The call control node comprises an edge determination component adapted for determining if the call control node is an edge node by assessing if the call control node controls exactly one section of the harmonization path; a reception component adapted for receiving a supported codec list; a selection component adapted for selecting a codec indicated by the supported codec list as the selected codec for the harmonization path; and a transmission component adapted for transmitting a selected codec indication indicative of the selected codec towards the opposite edge node of the harmonization path.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as specific network topologies including particular network nodes, communication protocols etc., in order to provide a thorough understanding of the current invention. It will be apparent to one skilled in the art that the current invention may be practised in other embodiments that depart from these specific details. For example, the skilled artisan will appreciate that the current invention may be practised with communications networks different from the UMTS networks discussed below to illustrate the present invention. The invention may be practised with any network in which multiple transcoding steps are performed. This may include for example wireless networks, as the transmission of data via an air interface may generally require compressing the data for efficient bandwidth usage. This may further include transit networks configured to perform transcoding steps; consider for example a mobile network being a transit network for a PSTN-PSTN call. The data transported may not only be speech data, but may be any kind of data which can be compressed, e.g. video data.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

The term "interface" or "interface component" as used herein may denote a functional interface, i.e. a sub-structure contained within a functional component or higher-level structure (e.g., a hardware and/or software component or functional entity) specifically designed for performing communications with further, external components or structures. A functional interface may typically, but not exclusively, be implemented in software.

Figure 1:
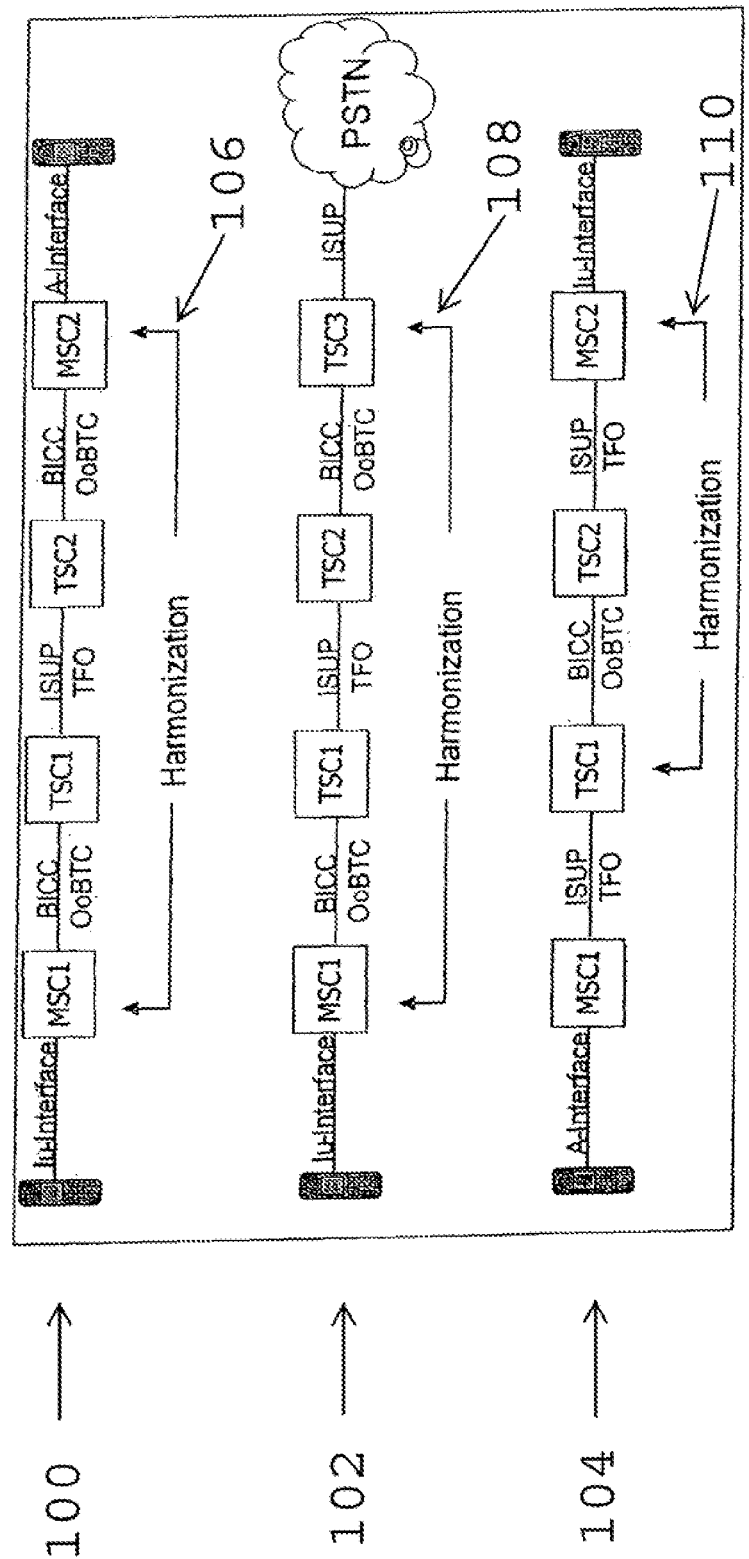
FIG. 1 is a schematic illustration of some embodiments of call paths comprising each a harmonization path.

FIG. 1 schematically illustrates three call paths 100, 102 and 104. For each call path an exemplary harmonization path 106, 108, 110 is illustrated. The call path 100 extends between an Iu-interface and an A-interface and includes two OoBTC (codec negotiation) sections based on BICC and a TFO section. Each of the separate codec negotiation procedures performed, for example, before call setup between MSC1-TSC1 and TSC2-MSC2 may result in a locally optimal codecs for the corresponding sections. However, the used codecs may not be identical or compatible to each other. Further, one or more of these codecs may be suboptimal codecs, for example in terms of speech quality or bandwidth usage. The TFO negotiation procedure performed between TSC1 and TSC2 after call setup may detect that the selected codecs are not harmonized. A harmonization procedure may thus be performed to determine a codec or codec combination which is optimal for the entire call path 100.

The harmonization procedure is performed along a harmonization path, which comprises at least a part of the call path in the core network. In the MMC call based on the call path 100, for example, the harmonization path 106 may extend between the call control nodes MSC1 and MSC2 serving the calling and the called subscriber, respectively. Generally, the harmonization path may include a section of the call path if a signalling procedure in this section may transport harmonization information, i.e. signalling information related to the harmonization procedure, for example in the form of signalling messages. Such a signalling procedure may be specifically defined or may be based on a local codec establishment procedure which is adapted to transport harmonization signalling information between the corresponding call control nodes. The radio access may not be part of a harmonization path; therefore the call control node serving the access is responsible for aligning the codec used in the access network (i.e., over the air interface) with the codec used in the section of the harmonization path the node controls.

The harmonization path may comprise adjacent sections, which use different signalling procedures for the transport of harmonization signalling information. In that case, interworking nodes at the points where the sections border to each other have to be adapted to appropriately convert the signalling information. In the examples depicted in FIG. 1, it is assumed that the BICC protocol for the codec negotiation section as well as a TFO negotiation procedure for the TFO section is adapted to transport harmonization signalling information. Therefore, as an example, the harmonization path 106 comprises a chain of adjacent codec negotiation sections and TFO sections. The harmonization path thus includes the entire call path in the core network, i.e. the path between the two radio access points. The harmonization path 106 may however extend over several PLMNs. For example, the nodes MSC1 and TSC1 on the one hand and the nodes TSC2 and MSC2 on the other hand may belong to different PLMNs.

The discussion of the harmonization path 106 applies similarly to the paths 108 and 110. The call path 102 differs from the path 100 for that it terminates at a fixed network (PSTN) instead of a radio access. Regarding the harmonization path 110, it is generally to be noted that a harmonization path may be shorter than the call path 104. For example, a section of the call path which does not allow transport of harmonization signalling information may not be included in a harmonization path. Therefore a call path may not only comprise a harmonization path which is shorter, but may also comprise more than one harmonization path.

Figure 2:
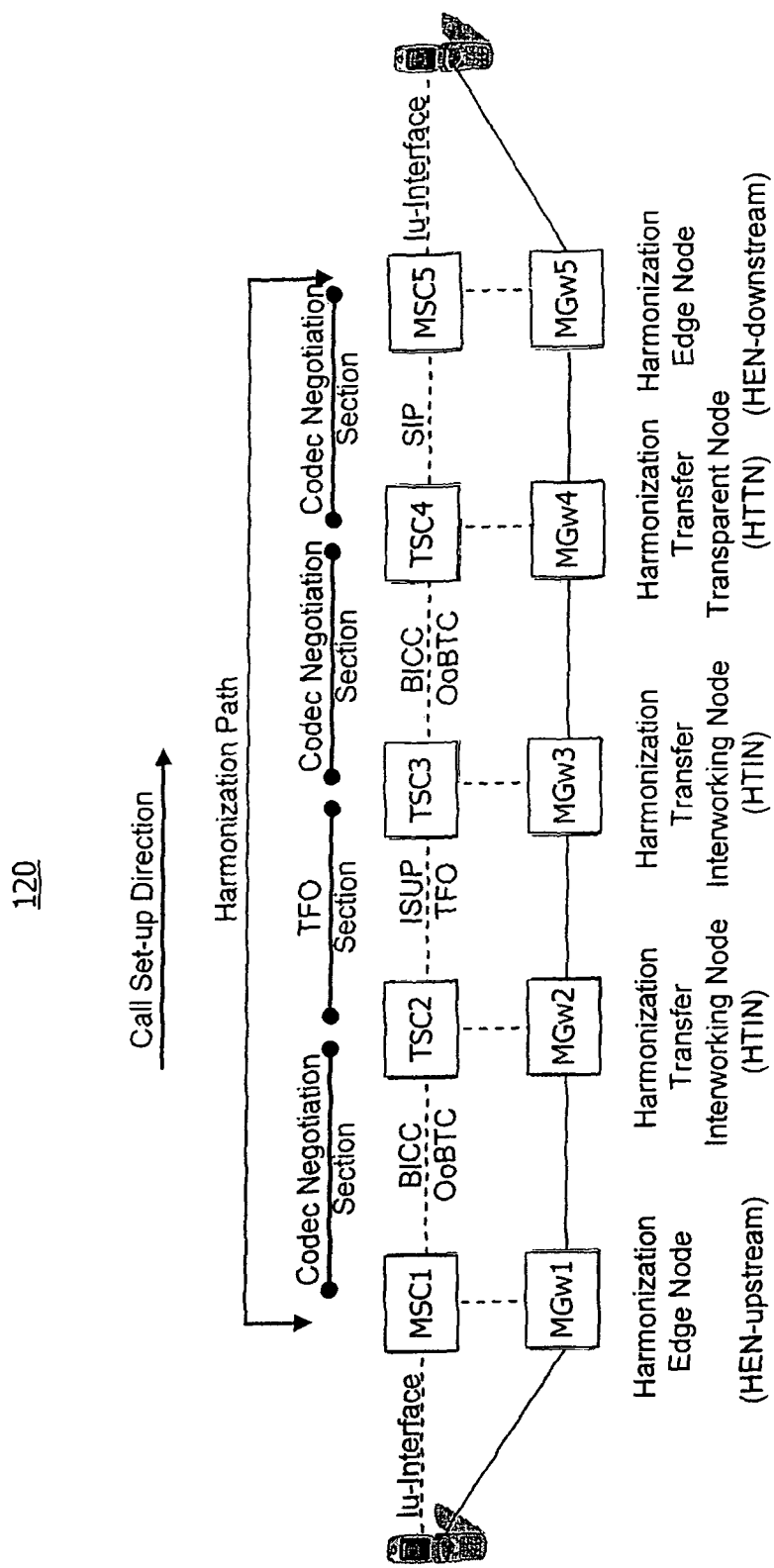
FIG. 2 is a schematic illustration of elements of a first embodiment of a harmonization path.

FIG. 2 illustrates in more detail an embodiment 120 of a call path with a harmonization path extending end-to-end between two radio accesses. Each of the call control nodes acts according to its specific role in the harmonization path. In other words, its position in a harmonization path determines the actions taken by a call control node during the harmonization procedures. For example, the nodes MSC1 and MSC5 act as harmonization edge nodes (HEN) upstream and downstream, respectively, regarding the call set-up direction. The functions associated with each of the roles depicted in FIG. 2 will be described in detail in the following. The harmonization transfer nodes TSC2-TSC4 are located within the harmonization path.

Figure 3:
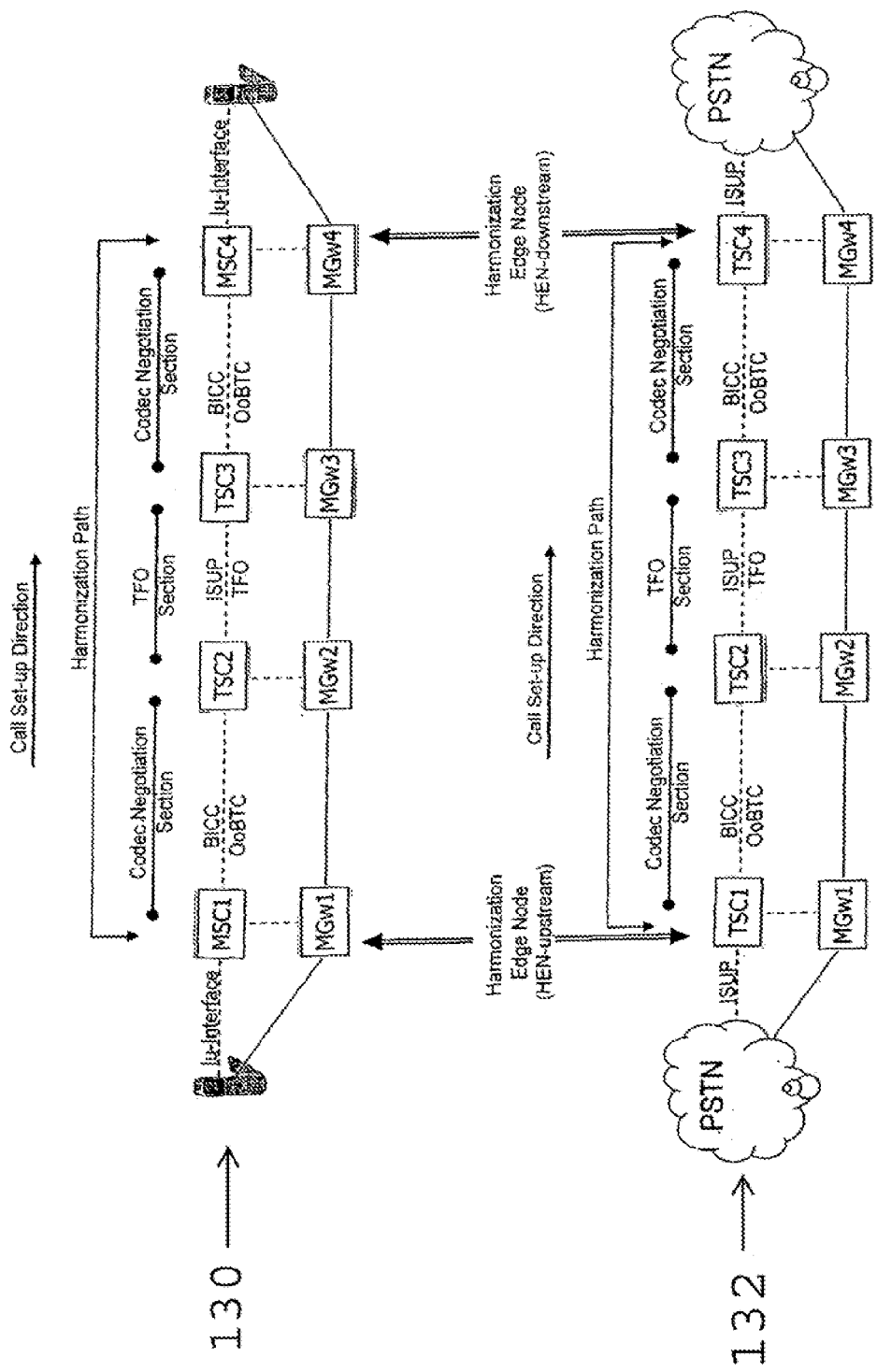
FIG. 3 is a schematic illustration of elements of a second and third example embodiment of a harmonization path.

FIG. 3 further illustrates call paths 130, 132 with harmonization paths extending between harmonization edge nodes (upstream) and harmonization edge nodes (downstream), where the HEN towards the originating side of the call path is the HEN (upstream) and the HEN towards the terminating side of the call path is the HEN (downstream). The call path 302 runs between two fixed (PSTN) networks over nodes TSC1-TSC4 in one or more PLMNs.

Figure 4:
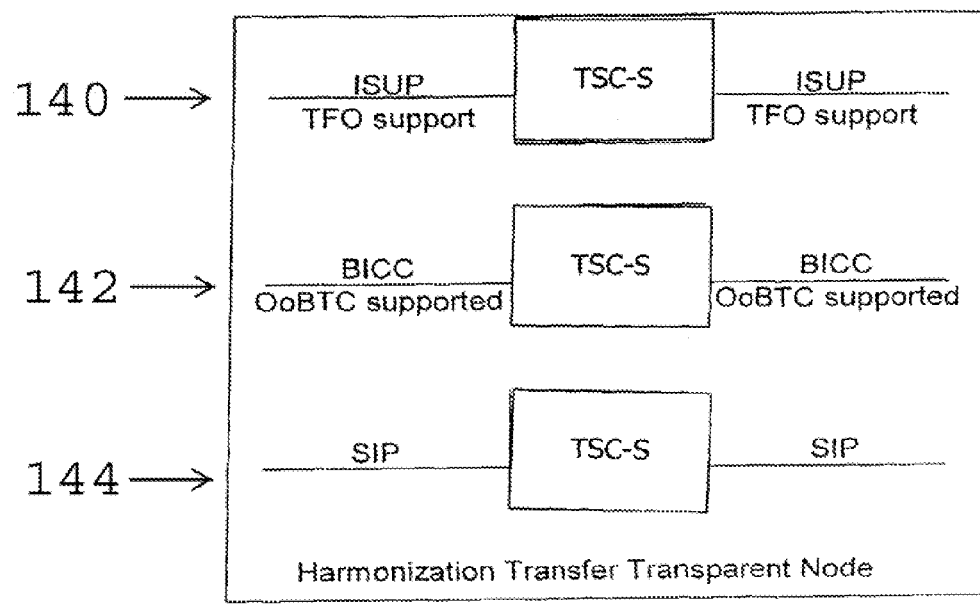
FIG. 4 is a schematic illustration of some first embodiments of a transfer node of a harmonization path.

Harmonization transfer nodes (HTNs) may act to transparently forward harmonization signalling information, e.g., harmonization (signalling) messages. 'Transparent' means that neither in the control node itself nor in the controlled transcoder units or MGWs an action is required or a function performed (apart from the forwarding function and possibly a filter function). FIG. 4 schematically illustrates three example embodiments 140, 142, 144 of such harmonization transfer transparent nodes (HTTNs).

The HTTN 140 connects two TFO sections. A controlled MGW (not shown) may act as a TFO-compatible in-path equipment (IPE, see 3GPP TS 28.062), such that any TFO inband message will pass through the controlled MGW transparently. The HTTN 142 connects two codec negotiation sections, which are based on BICC. In this case, codec (re-) negotiation may be continued in the transfer node 142. The node may also be transparent for the harmonization procedures (apart from that possibly a selected codec list is filtered). The HTTN 144 is similar to node 142, but connects two SIP-based codec negotiation sections.

Figure 5:
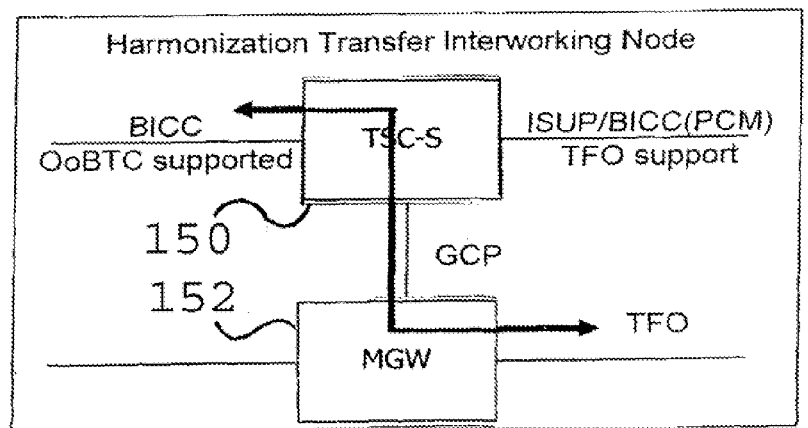
FIG. 5 is a schematic illustration of a second embodiment of a harmonization transfer node.

FIG. 5 schematically illustrates an example 150 of a harmonization transfer interworking node (HTIN). The call control node 150 connects a section with a codec establishment procedure located in the control plane, namely a BICC-based codec negotiation section and a section with a codec establishment procedure located in the user plane, namely a TFO section. Harmonization signalling information thus has to be passed from the codec negotiation control plane protocol to the TFO user plane protocol and vice versa. Corresponding signalling messages have to be exchanged between the node 150 and the controlled MGW 152, for example by re-using the GCP (Gateway Control Protocol, H.248 according to the ITU-T) for controlling the MGW.

Figure 6:
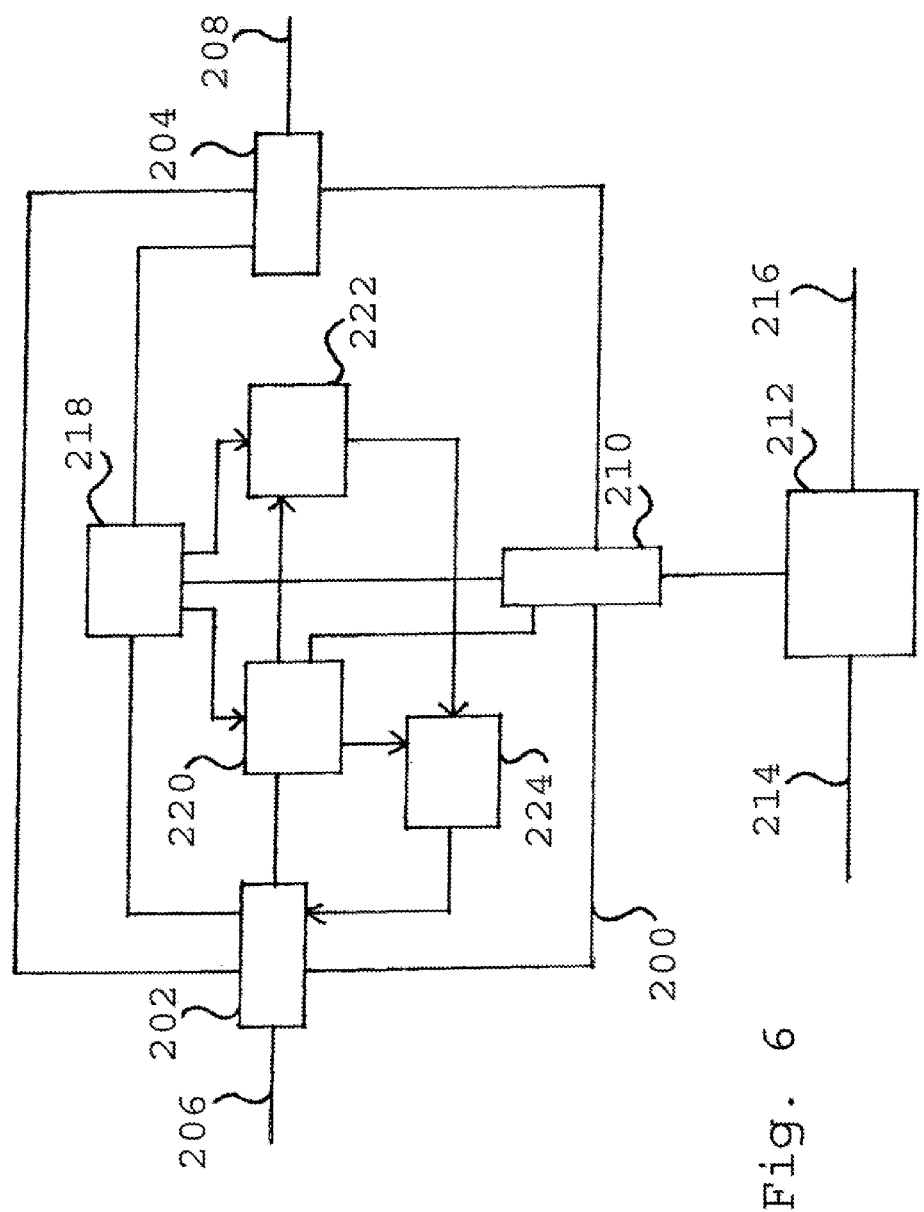
FIG. 6 is a functional block diagram schematically illustrating a third embodiment of a transfer node of a harmonization path.

FIG. 6 is a schematic block diagram of an embodiment of a call control node 200 which is adapted for controlling at least one section of a call path, wherein the call path includes between two opposite edge nodes (not shown) a multi-section harmonization path along which codec selection is to be harmonized. The call control node 200 is a transfer node in the harmonization path between the edge nodes. The node 200 may be an implementation of one of the transfer nodes depicted in the FIGS. 1-5.

The node 200 comprises interface components 202 and 204 adapted for receiving and forwarding signalling information via the signalling links 206 and 208 to neighbouring call control nodes along the call path. A further signalling interface 210 is adapted for controlling a transcoder unit in a MGW 212 associated to the control node 200. Speech data are forwarded along the call path designated by user data transport links 214 and 216.

It will exemplarily be assumed in the following that the control node 200 is an element at the border of a codec negotiation section. The signalling interface 202 is adapted for the BICC protocol to negotiate codecs with further control nodes in this section. On the other hand, the signalling link 208 may comprise an ISUP connection to further call control nodes along the call path, such that codec negotiation is not possible via the link 208. However, the interface 210 and the MGW 212 are adapted for TFO negotiation such that TFO may be established along the transport link 216. In this way, the node 200 may also be an end element of a TFO section. The node 200 thus is a HTIN.

The call control node 200 comprises a first determination component 218 adapted for determining if the call control node 200 is an element of the harmonization path. The determination component 218 is triggered, for example, by the reception of an appropriate signalling message indicating that a call path has been established or changed. In response to such a triggering event the component 218 requests from the interface components 202, 204 and 210 an indication of the codec establishment procedures used, e.g., during call setup. The interface component 202 may respond by indicating that an OoBTC procedure based on the BICC protocol is in use, which is adapted for transporting harmonization signalling information. The interface component 204 may not respond with an indication, as no codec establishment procedure is performed along the signalling link 208 and also no specific harmonization signalling protocol is available for the link 208. The interface component 210 may respond by indicating that a TFO negotiation procedure is used for codec establishment between the media gateway 212 and its TFO partner, which may also transport harmonization signalling information. The interface component may for example provide a TFO System ID received from the TFO peer to the determination component 218.

Based on the response, the determination component 218 determines if the control node is part of a harmonization path. This is the case if the control node 200 controls at least one codec establishment section in which harmonization information may be transported. In the example discussed here, the call control node 200 is part of a harmonization path because the node 200 is at the border of a codec negotiation section (links 206, 214) and also because the node 200 is at the border of a TFO negotiation section (link 216). In case the node 200 is an element of a harmonization path, the component 218 sends a trigger signal to a second determination component 220 and a third determination component 222.

The second determination component 220 is adapted for determining if a codec selected for the at least one section controlled by the call control node 200 fulfils a predefined harmonization criterion. The criterion may comprise several sub-criterions, which are accounted for in corresponding determination procedures implemented in the component 220.

Firstly, the determination component 220 may determine that the criterion is not fulfilled if TFO cannot be established in the controlled TFO section based on link 216, or if TrFO cannot be established along section 214, such that the codec to be used along the corresponding section may not be an optimal codec. The determination component 220 may further compare the codec selected in section 214 with the codec used in section 216. If the codecs are not compatible to each other, the determination component may conclude that an optimal codec has to be found, namely a single codec for both sections or a combination of compatible codecs.

Regarding the particular codecs selected or used in the two sections controlled by the control node 200, the determination component 220 may, secondly, request information regarding the momentarily used codecs from both the interface components 202 and 210. These respond by indicating the codecs in use in the sections based on the links 214 and 216, respectively. The determination component 220 then acts to compare each of the codecs in use with a prioritized codec list. Codecs in the list are assigned a priority according to objectives of the network operator. For example, codecs may be sorted in the list according to speech quality, bandwidth requirements or use of resources in transcoder units. The codecs may also be sorted to achieve a combination of these or other objectives. One or more of the listed codecs may be optimal codecs in that they best meet the objectives. The list may be stored in a storage component of the control node 200 (not shown) and/or may be received on request from an administration component of the network the call control node 200 belongs to. From a comparison of the used codec with the one or more optimal codecs in the list, the determination component 220 determines if an optimal codec is already in use in a particular section.

In case it is determined that for at least one of the sections controlled by the call control node 200 a codec is used which does not fulfil the harmonization criterion, e.g., the used codec is not an optimal codec, the determination component 220 provides an internal trigger signal to a trigger component 224.

On reception of the trigger signal from the first determination component 218, the third determination component 222 acts to determine if the call control node 200 is a transfer node of a harmonization path. To this end, the component 222 assesses, if the control node 200 controls two sections of the call path, in which a codec establishment procedure is used which is enabled to transport harmonization signalling information (this is the basic condition for the control node 200 being an element of a harmonization path).

Typically, a control node may be an edge node when the control node is a gateway to a PSTN or is located next to a radio access network (RAN). Further, the control node may control a first section available for harmonization, but also a second section of the call path, where no harmonization information can be transported. In other cases, the control node may be a transfer node.

To solve its task, the third determination component 222 may receive information related to the number of controlled sections from the second determination component 220. The third determination component 222 provides an information to the trigger component 224 indicating that the control node 200 is a transfer node (not an edge node) of a harmonization path.

On reception of the trigger signal from the second determination component 220, the trigger component 224 provides a harmonization trigger indication to an edge node of the harmonization path for initiating harmonization, as a codec selected in a section controlled by the call control node 200 is not an optimal codec. The trigger component firstly processes the indication from the third determination component 222 that the control node 200 has to act as a transfer node of the harmonization path. As, in the present embodiment, the harmonization procedure will be started from an edge node of the harmonization path, the trigger indication has to be embedded in a signalling message to be sent along the harmonization path to at least one of the edge nodes of the harmonization path. In case of the call control node being an edge node, the trigger indication may only be provided to an internal component of this edge node.

The trigger component 224 detects that the section 206 is a codec negotiation section and constructs a signalling message according to the codec negotiation protocol (BICC) used over the signalling link 206. The signalling message includes the harmonization trigger indication. The trigger component 224 provides the signalling message to the interface component 202, which transmits the message to the adjacent call control node along the harmonization path.

The node 200 may comprise further components adapted for receiving and forwarding a harmonization trigger indication, a supported codec list and/or a selected codec. Also, the node 200 may comprise further components adapted for changing, in case a codec used in one or both of the sections 214, 216 of the harmonization path is not at least compatible with the codec indicated by a received selected codec indication, the used codec to the codec indicated by the selected codec indication. These components have been omitted in FIG. 6.

Figure 7:
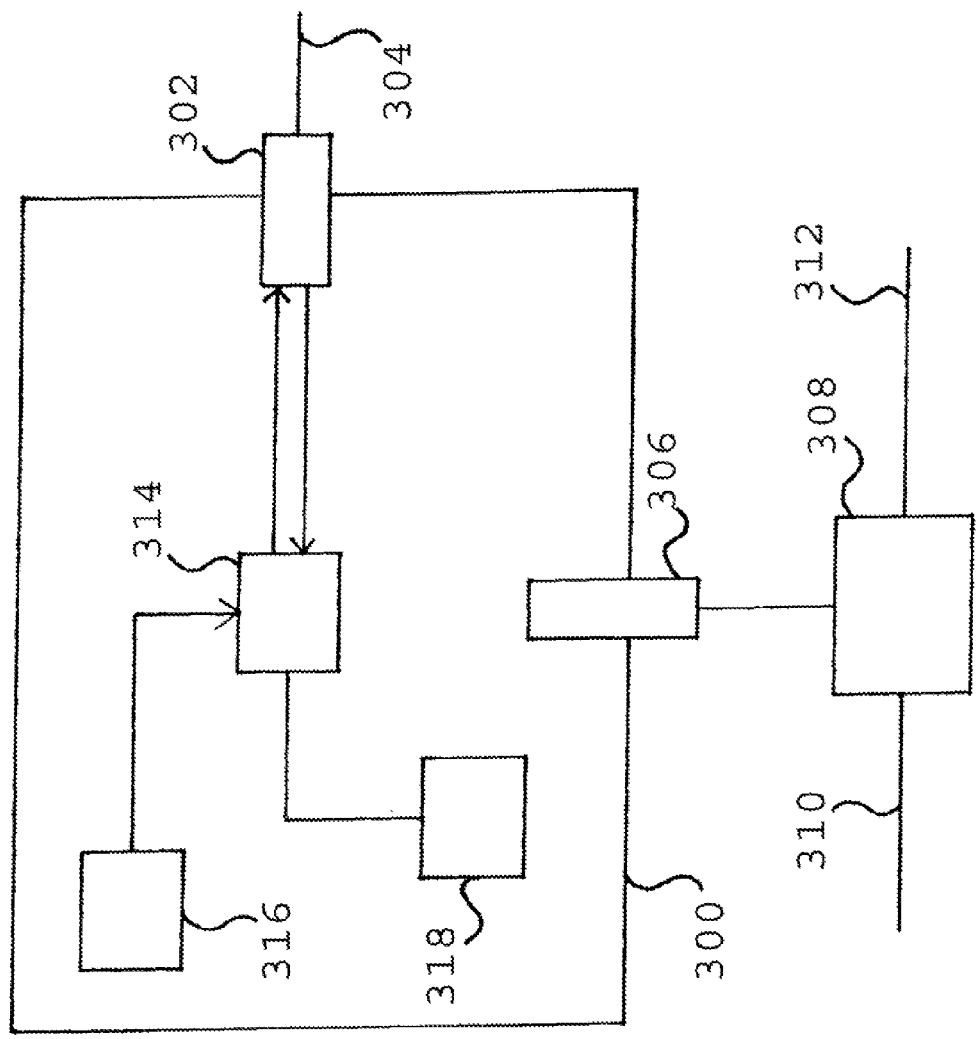
FIG. 7 is a functional block diagram schematically illustrating a first embodiment of an edge node of a harmonization path.

FIG. 7 is a block diagram schematically illustrating an embodiment of a call control node 300 adapted for controlling at least one section of a call path, wherein the call path includes between two opposite edge nodes a multi-section harmonization path along which codec selection is to be harmonized. The call control node 300 is one of the edge nodes of the harmonization path. The functionality described with reference to FIG. 6 may however also be included in the harmonization edge node 300. The control node 300 may be an implementation of one of the edge nodes depicted in FIGS. 1-3.

The call control node 300 comprises an interface component 302 for transmitting and receiving signalling messages over a signalling link 304 with an adjacent call control node (not shown) along a call path. The control node 300 further comprises an interface component 306 for exchanging signalling messages with a MGW 308 associated with the control node 300. User data transport links 310 and 312 of the call path are terminated at the MGW 308. The link 310 may connect to a radio access network, the link 312 may belong to an OoBTC section.

A harmonization trigger message may be received by the interface component 302 (originating, for example, from the call control node 200 of FIG. 6). The message includes a harmonization trigger indication, which is provided by the interface component 302 to a harmonization information component 314. Triggered by the reception of the indication, the harmonization information component 314 initiates the harmonization procedure along the harmonization path.

The control node 300 comprises a trigger component 316 which corresponds in its functionality to the trigger component 216 as illustrated in FIG. 6. Components similar to components 218, 220, 222 of FIG. 6 are omitted in FIG. 7 for brevity. The harmonization trigger component 314 may alternatively or additionally to the external trigger also receive a harmonization trigger indication from the internal trigger component 316.

The harmonization information component 314 is adapted for transmitting, in case the call control node 300 acts as an edge node of the harmonization path, in response to a harmonization trigger indication a supported codec list (SCL) towards an opposite edge node of the harmonization path. On reception of the trigger indication, the component 314 firstly requests from a determination component 318 an indication if the call control node 300 is an edge node of the harmonization path.

The edge determination component 318 is adapted for determining if the call control node 300 is an edge node of the harmonization path. This may be the case if the call control node 300 controls exactly one section of the harmonization path.

On the indication that the call control node 300 is an edge node of the harmonization path (because the node 300 controls only one section belonging to the harmonization path, namely the section based on link 312), the component 314 constructs a harmonization information message including the SCL. The SCL may be based on a list of available codecs generally supported by the MGW 308, the air interface connected to the link 310, and a served mobile user device. The SCL may contain available codecs which best meet predetermined objectives, e.g. speech quality or required bandwidth.

The harmonization information message is provided to the interface component 302, which transmits the message towards the next call control node along the harmonization path, i.e. the call control node terminating the other side of the signalling link 304. The harmonization information message may be sent node-by-node along the call path. Each call control node receiving the message will process the message according to its role. For example, a transfer node will forward the message to the next node. Therefore the edge node 300 does not need to know the address of the edge node terminating the harmonization path at the opposite edge.

The node 300 may comprise further components adapted for changing, in case a codec used in one or both of the sections 310 and 312 is not at least compatible with the codec indicated by a received selected codec indication, the used codec to the codec indicated by the selected codec indication. These components have been omitted in FIG. 7.

Figure 8:
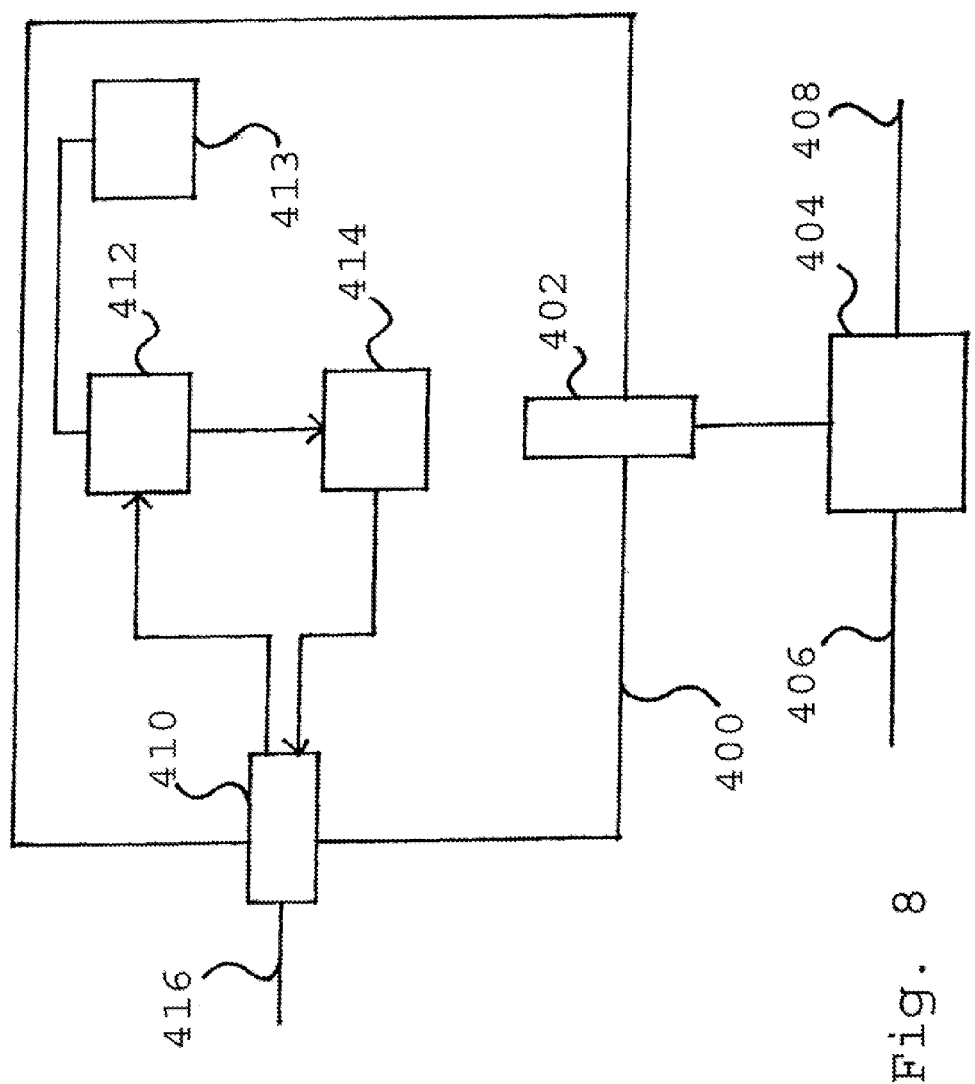
FIG. 8 is a functional block diagram schematically illustrating a second embodiment of an edge node of a harmonization path.

FIG. 8 is a block diagram schematically illustrating an embodiment of a call control node 400 adapted for controlling at least one section of a call path, wherein the call path includes between two opposite edge nodes a multi-section harmonization path along which codec selection is to be harmonized. The call control node 400 is one of the edge nodes of the harmonization path, which receives a harmonization information message from the opposite edge node. Whereas not shown in FIG. 8, the functionality described with reference to FIG. 6 may also be included in the harmonization edge node 400. The control node 400 may be an implementation of one of the edge nodes illustrated in FIGS. 1-3.

The call control node 400 comprises an interface component 402 for exchanging signalling messages with a MGW 404 controlled by the control node 400. A communication link 406 may belong to a section of a harmonization path, whereas a further link 408 does not belong to the harmonization path. The control node 400 comprises components similar to components 218, 220 of FIG. 6, which are omitted in FIG. 8 for brevity.

The control node 400 further comprises an interface component 410 for exchanging signalling messages with a peering call control node (e.g., a harmonization transfer node) along the harmonization path. The interface component 410 acts as a reception component adapted for receiving a supported codec list from an opposite edge node of the harmonization path (for example the node 300 of FIG. 3). The reception component 410 may receive the supported codec list embedded into a harmonization information message.

The component 410 forwards the information message to a selection component 412 adapted for selecting one of the codecs indicated by the supported codec list as the selected codec for the harmonization path. On reception of the information message, the component 412 requests from a determination component 413 an indication if the call control node 400 is an edge node of the harmonization path. The edge determination component 413 works similar to the edge determination component 318 in FIG. 7.

On the indication that the call control node 400 is an edge node of the harmonization path (because the node 400 controls only one section belonging to the harmonization path, namely the section based on link 406), the selection component 412 may compare each of the codecs of the supported codec list with a prioritized list of codecs and may select that codec from the supported codec list which is assigned the highest priority. The selection component 412 provides an indication of the selected codec to the transmission component 414. This component is adapted for transmitting the selected codec indication towards the other edge node of the harmonization path. The transmission component 414 constructs a harmonization decision message, which includes the selected codec indication and provides this message to the interface component 410, which transmits the message to the peering node terminating the signalling connection 416 (and thus towards the opposite edge node of the harmonization path).

The node 400 may comprise further components adapted for changing, in case a codec used in one or both of the sections 406 and 408 is not at least compatible with the codec indicated by the selected codec indication, the used codec to the codec indicated by the selected codec indication. These components have been omitted in FIG. 8.

Figure 9:
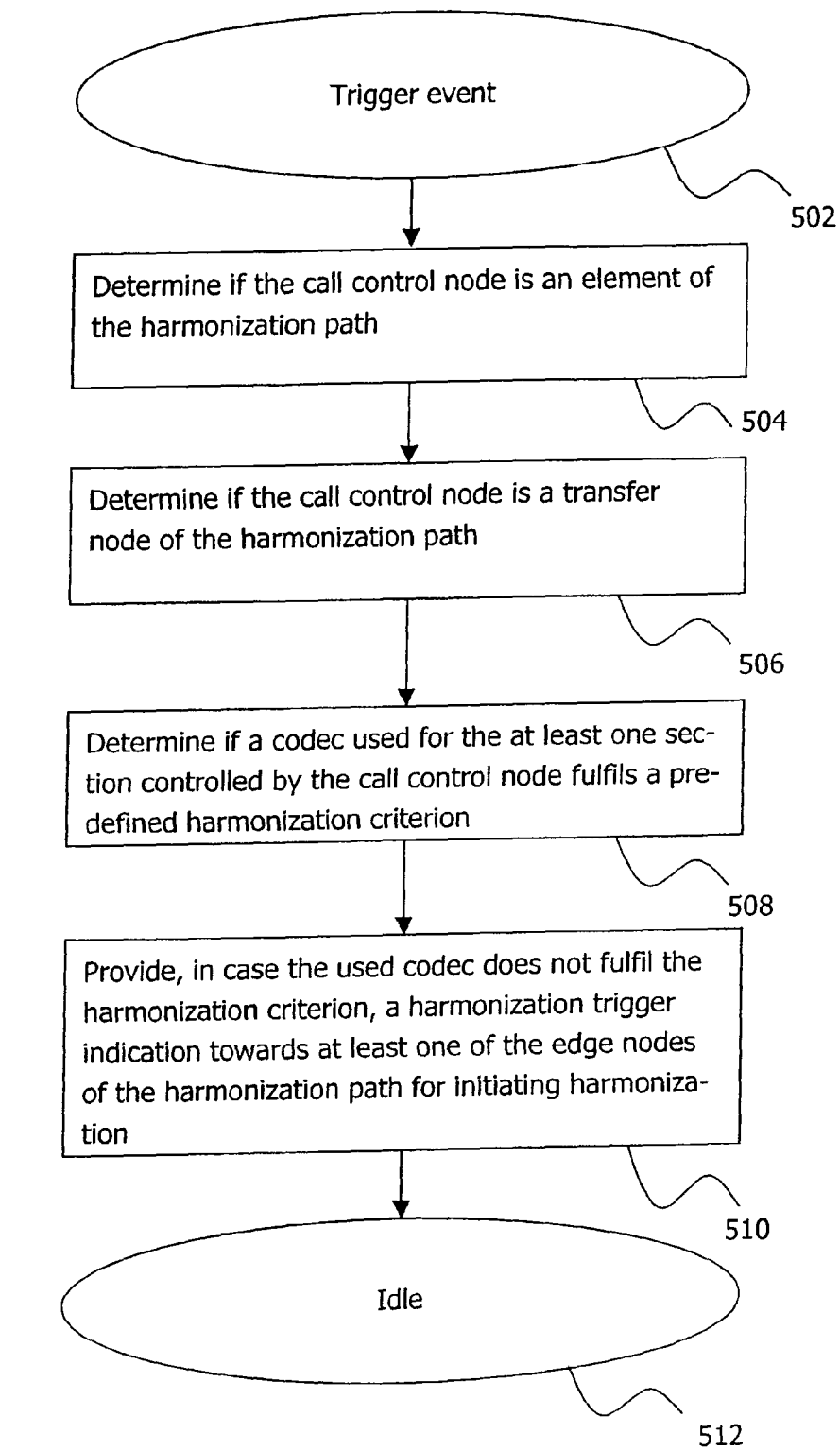
FIG. 9 is a flowchart illustrating steps of a method embodiment of operating a transfer node in a harmonization path.

FIG. 9 is a flowchart illustrating the steps of a method embodiment 500 of operating a call control node controlling at least one section of a call path, wherein the call path includes between two opposite edge nodes a multi-section harmonization path along which codec selection is to be harmonized. The call control node is a transfer node in the harmonization path between the edge nodes.

The method is triggered in step 502, e.g., by information indicating that the call control node is involved in a call path which has been newly established or changed. For example, the information may relate to a call setup or a supplementary service changing the call path. In step 504, it is determined if the call control node is an element of the harmonization path. A call control node may for example be an element of a harmonization path if it controls at least one codec negotiation section or one TFO section belonging to the call path. The call control node may determine that it controls a codec negotiation section in case it is capable to participate in a codec negotiation procedure, for example if it is capable of processing BICC signalling messages. A call control node may control a TFO section if it controls a MGW hosting a TFO protocol handler enabled for TFO negotiation. Any of these codec establishment procedures shall be enabled for transporting harmonization signalling information.

In step 506, it is determined if the call control node is a transfer node of the harmonization path. For example, it may be assessed if the call control node controls two sections of the harmonization path. The call control node may be a transfer node, if it controls two sections along which a codec establishment procedure is in use which is enabled for transporting harmonization signalling information. For example, the call control node may control one codec negotiation section and one TFO section. In the alternative, the role of a transfer node may be assigned to the call control node via administration, such that the step 504 may be omitted and step 506 may be implemented as a lookup operation in a database associated with the call control node. One or both of the steps 504 and 506 may be performed before and independent of any particular call set-up.

In step 508, it is determined if a codec used for the at least one section controlled by the call control node fulfils a predefined harmonization criterion. In case the used codec does not fulfil the harmonization criterion, in step 510 a harmonization trigger indication is provided towards at least one of the edge nodes of the harmonization path for initiating harmonization. After having provided the trigger indication to the edge element, the procedure returns into an idle state in step 512.

Figure 10:
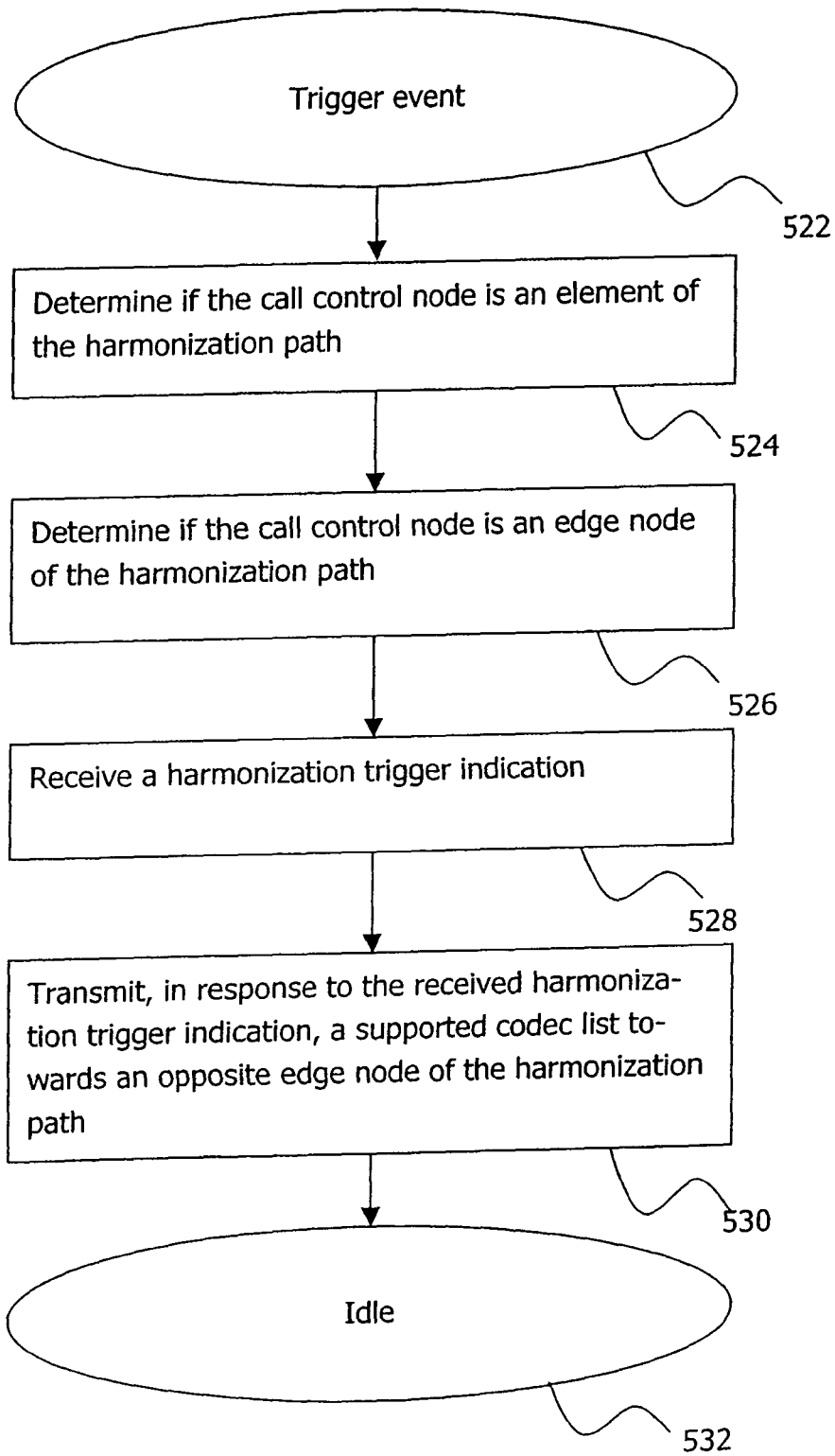
FIG. 10 is a flowchart illustrating steps of a first method embodiment of operating an edge node in a harmonization path.

FIG. 10 is a flowchart illustrating the steps of a method embodiment 520 of operating a call control node controlling at least one section of a call path, wherein the call path includes between two opposite edge nodes a multi-section harmonization path along which codec selection is to be harmonized. The call control node is one of the edge nodes of the harmonization path.

The steps 522 to 526 correspond to the steps 502 to 506 in FIG. 5, except that in step 526 the call control node determines if it is an edge node of the harmonization path, e.g. by assessing if the call control node controls exactly one section of the harmonization path. That the node is an edge node defines its response to harmonization information received from other nodes of the harmonization path.

In step 528, the call control node receives a harmonization trigger indication. The indication may be received from external (i.e. from another node of the harmonization path) or internal (i.e. from a component such as the component 316 in FIG. 3). In step 530, the call control node transmits, in response to the received harmonization trigger indication, a supported codec list towards an opposite edge node of the harmonization path. After having provided the SCL to the harmonization path, the procedure returns into an idle state in step 532.

Figure 11:
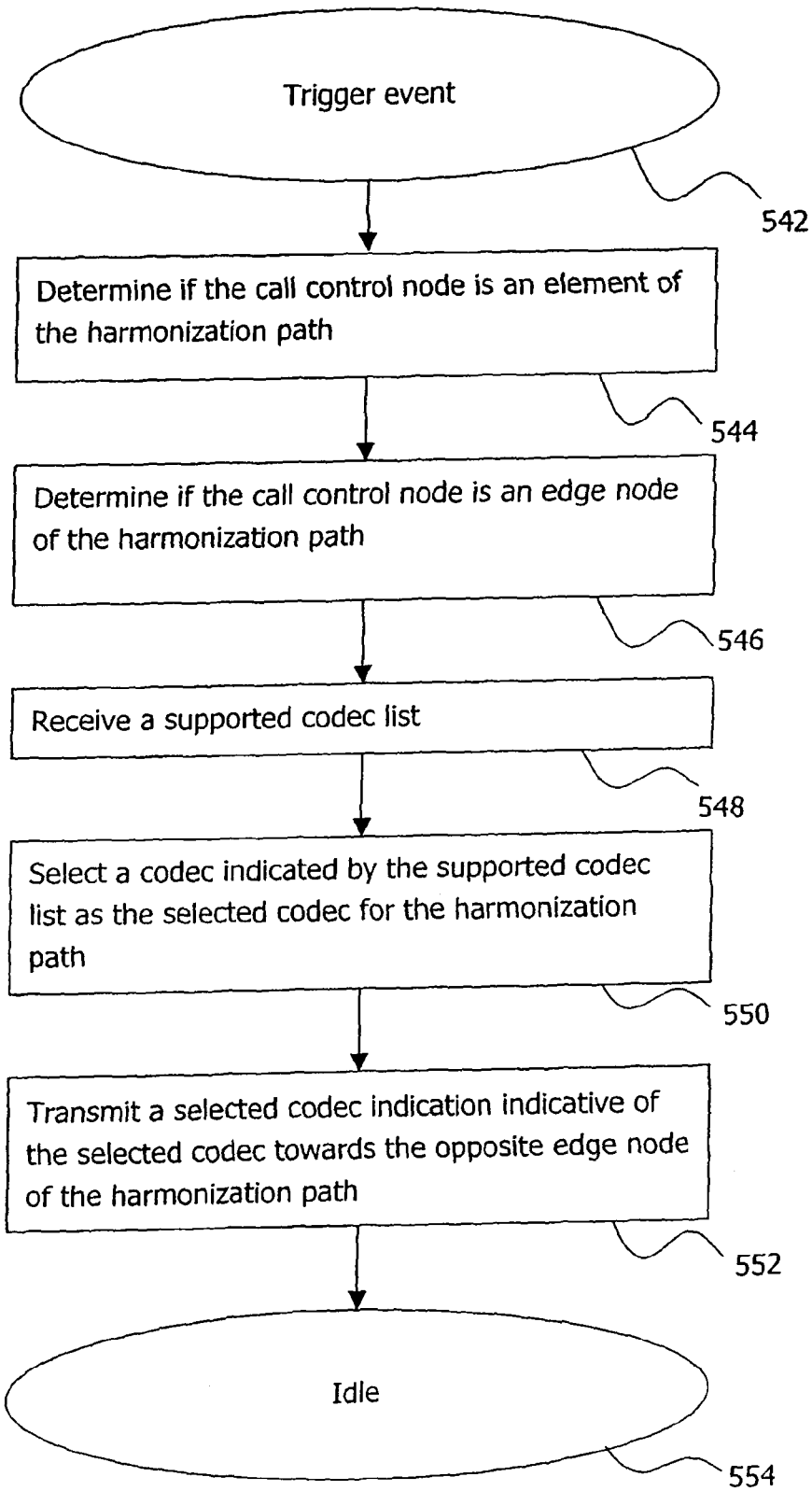
FIG. 11 is a flowchart illustrating steps of a second method embodiment of operating an edge node in a harmonization path.

FIG. 11 is a flowchart illustrating the steps of a method embodiment 540 of operating a call control node controlling at least one section of a call path, wherein the call path includes between two opposite edge nodes a multi-section harmonization path along which codec selection is to be harmonized. The call control node is again one of the edge nodes of the harmonization path.

The steps 542 to 546 correspond to the steps 522 to 526 in FIG. 10. In step 548, a supported codec list is received. In step 550, a codec indicated by the supported codec list is selected as the selected codec for the harmonization path. In step 552, a selected codec indication indicative of the selected codec is transmitted towards the opposite edge node of the harmonization path. The indication may for example be transmitted in a n-b-n message towards the next node in the harmonization path. After having provided the selected codec to the harmonization path, and possibly after changing a used codec in the section of the harmonization path controlled by the call control node, the procedure returns into an idle state in step 554.

Figure 12:
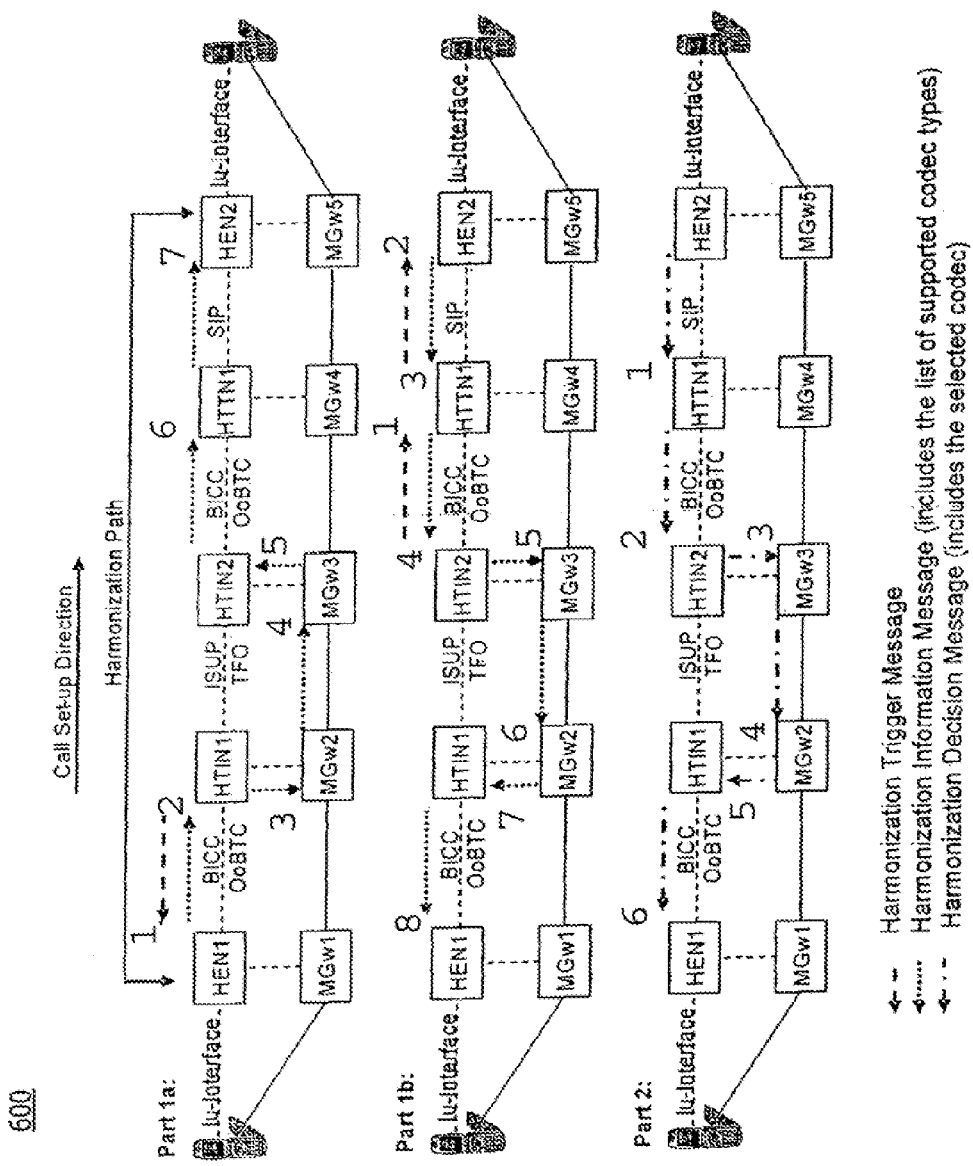
FIG. 12 is a schematic illustration of a first embodiment of a harmonization procedure.

FIG. 12 schematically illustrates for an embodiment of a harmonization procedure 600 the flow of harmonization messages along the harmonization path comprising the entire call path of an MMC in a mobile core network. The harmonization path comprises two codec negotiation sections based on BICC, a single codec negotiation section using SIP as codec negotiation protocol, and a TFO section. For the interworking of codec negotiation sections and the TFO section, the nodes HTIN1 and HTIN2 have to act as transfer interworking nodes, which pass harmonization signalling information between the BICC protocol and the TFO protocol.

It is assumed that TFO cannot be established between HTIN1 and HTIN2. Therefore both HTIN1 and HTIN2 determine that the codec used over the TFO section is a suboptimal codec. During call setup, both control nodes have already determined that they are elements of the harmonization path and that they are not edge nodes, but transfer (interworking) nodes.

Both control nodes send a harmonization trigger message including a harmonization trigger indication, HTIN1 towards the edge node HEN1 (part 1*a*) and HTIN2 towards the edge node HEN2 (part 1*b*). The harmonization procedure is implemented such that the harmonization trigger message is only transported via the OoBTC protocol, i.e. the codec negotiation section, if the harmonization transfer node controls such section. In other embodiments the harmonization procedure may include sending the harmonization trigger message in both directions along the harmonization path, irrespective of the protocol used for the local codec establishment procedures.

In a still further embodiment the harmonization trigger message is only sent in one direction with respect to the call setup direction, e.g. only in forward direction or only in backward direction. For example, for a TFO section a TFO endpoint closer to an originating side may transmit a harmonization trigger message, while the TFO endpoint closer to a terminating side may not transmit a harmonization trigger message.

Referring again to FIG. 12, the trigger messages are forwarded node-by-node (n-b-n). Whereas the message of HTIN1 arrives directly at HEN1, the trigger message of HTIN2 is forwarded via HTTN1. Here, HTTN1 acts as a transfer node and forwards the received trigger message transparently along the harmonization path towards HEN2, as a trigger message is always directed towards the edge node of the harmonization path.

In response to the harmonization trigger indication, both edge nodes HEN1 and HEN2 build a supported codec list (SCL) indicating the codecs supported in the corresponding edge node. Each SCL is embedded into a harmonization information message, which then is transmitted n-b-n towards the other edge node. Each of the transfer nodes processes the received supported codec list according to its role. The processing thus comprises removing any codec from the SCL, which is not supported in the transfer node. The modified SCL is then forwarded to the next node along the harmonization path, as the harmonization information message is to be transported end-to-end (e2e).

In steps 2, 6 and 7 (denoted by the numbered arrows) in part 1*a* as well as in steps 3, 4 and 8 in part 1*b*, the respective information message is transported via the OoBTC protocol. To convey the harmonization messages via the TFO sections, the transfer interworking nodes HTIN and HTIN2 provide the supported codec list to their respective MGW, for example embedded in a TFO control message. In step 4 in part 1*a* and step 6 in part 1*b*, the respective supported codec list is transmitted in the user plane between the MGWs, for example using a TFO in-band signalling mechanism or using a generic configuration frame (e.g., a Con_Req or Con_Ack frame, see TS 28.062).

According to collision rules defined for the harmonization procedure, the upstream HEN1 ignores the received harmonization information message and only the downstream edge node HEN2 responds to the received harmonization information message with a harmonization decision message (part 2 of FIG. 11). The collision rules may for example specify that—in case more than one trigger message has been processed (received and/or transmitted) in the edge node, only the edge node downstream the call setup direction may provide for the decision message. Alternatively, the upstream edge node could provide for the decision message. The collision handling avoids that possibly conflicting decisions are announced to the harmonization path, i.e. only a single decision message will be passed along the harmonization path. In an alternative embodiment, wherein the harmonization trigger messages are sent only backwards, only the corresponding edge node receives a harmonization trigger message. Thus, only this node sends a harmonization information message including an SCL (in forward direction). Even in case the edge node receives several harmonization trigger messages, it may send only one harmonization information message.

Referring back to embodiment 600, in response to the reception of the harmonization information message originating from HEN1, HEN2 processes the received SCL by selecting a codec from the received list as the selected codec. This codec is introduced into a harmonization decision message, which is passed n-b-n and e2e along the harmonization path. To forward the harmonization decision message via the TFO section, in step 4 of part 2 again a TFO user plane mechanism is used. Each node along the path extracts the indicated codec as the selected codec for the call and forwards the decision message without modification. If necessary, the node further performs actions to change the codec used in the controlled sections to the selected codec.

Whereas the harmonization has been triggered at two points within the harmonization path (at HTIN1 and HTIN2), the further harmonization procedure is performed e2e along the harmonization path such that the harmonization information message(s) and the harmonization decision message are sent from edge node to edge node. The parts 1a and 1b of the procedure 600 in FIG. 11 may be performed more or less in parallel, i.e. each of the triggering transfer nodes sends its trigger message as soon as it determines the necessity to do so.

The speech codec harmonization may be triggered at any time after the call path has been established after call setup. For example, the call path may change after call setup due to a supplementary service such as Call Forwarding or Call Transfer. As another example, a change in the call path outside the core network may also trigger a harmonization procedure, e.g., in case a handover procedure is performed and a new speech codec is selected for the radio access. The access-serving call control node acting as an edge node of the harmonization path may then trigger the harmonization procedure and no trigger message will be sent along the harmonization path. In another embodiment, an edge node close to one end of the call path may send a harmonization trigger message towards the other edge node, such that the opposite edge node initiates the harmonization procedure.

Figure 13:
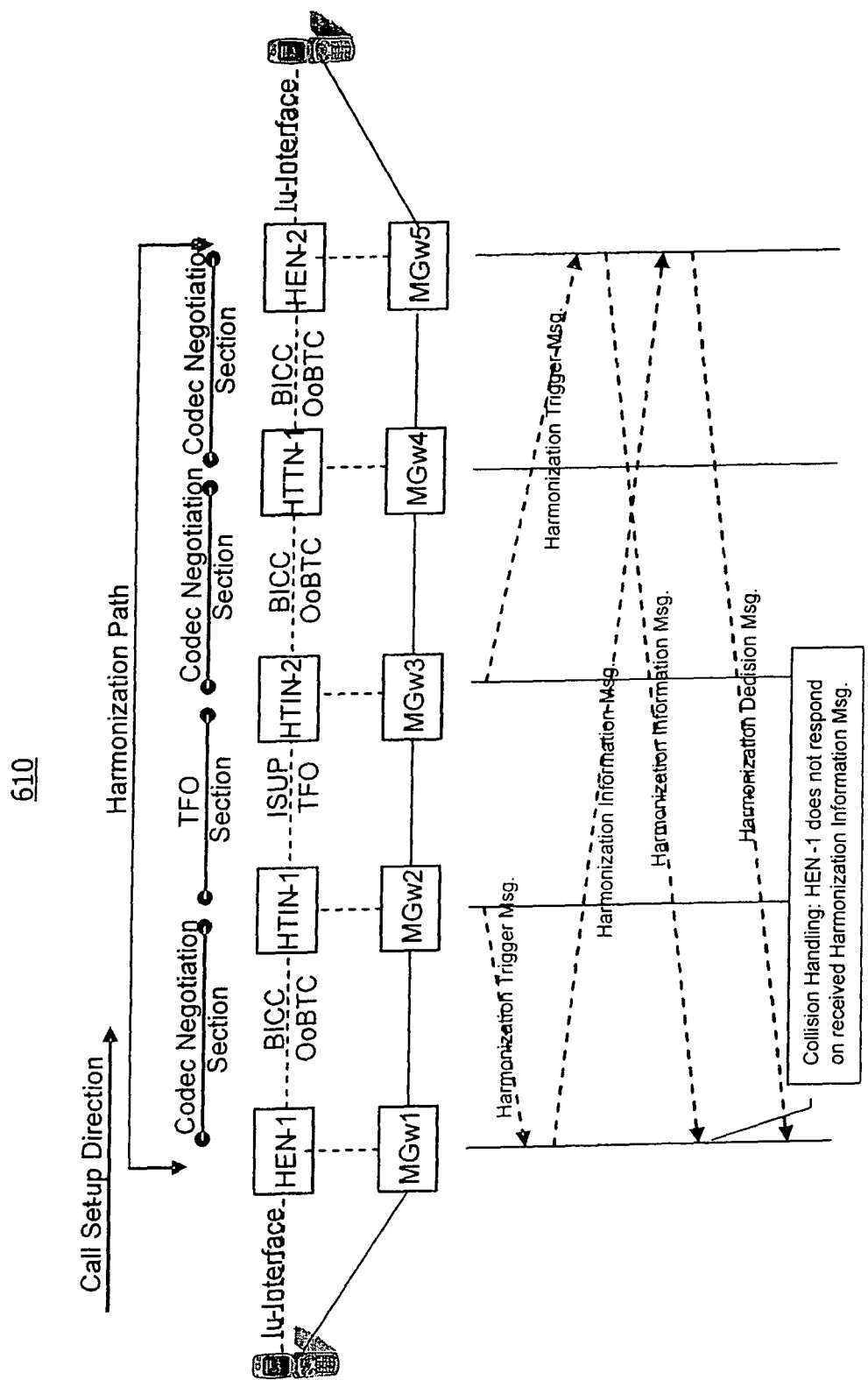
FIG. 13 is a schematic illustration of a second embodiment of a harmonization procedure.

FIG. 13 schematically illustrates another embodiment 610 of a harmonization procedure. Aspects of embodiment 610 similar or identical to aspects of embodiment 600 in FIG. 12 will be omitted from the description.

The harmonization path includes three codec negotiation sections, wherein BICC is used as the only OoBTC protocol, and a TFO section. Interworking nodes HTIN-1 and HTIN-2 have to pass harmonization messages between the BICC protocol and the TFO protocol. Existing messages of the BICC protocol and TFO negotiation mechanisms are re-used for transporting the harmonization signalling information. In alternative embodiments, a specific harmonization signalling protocol may be used for one or more of the call sections of a harmonization path.

Two harmonization trigger messages are generated by two HTINs (HTIN1, HTIN2) in two different directions. Subsequently, HEN1 handles the resulting collision (the two harmonization information messages of HEN1 and HEN2 collide) by silently discarding the harmonization information message originating from HEN2.

Regarding the aspect of error handling, transmission errors may cause that a message, e.g. a harmonization trigger, information, or decision message, is lost. In such an error case, for example, the sender of a harmonization trigger message may repeat the harmonization trigger message a predetermined number of times and/or until it sees a reaction in form of a harmonization information message. As another example, the sender of a harmonization information message may repeat the harmonization information message a predetermined number of times, until it sees the reaction in form of a harmonization decision message. As a still further example, a harmonization transfer node may see a harmonization information message, but has not yet received a corresponding harmonization decision message. In this case the transfer node may silently discard an own harmonization trigger message and wait for the harmonization decision message. In general, it is sufficient to have one harmonization information message and one harmonization decision message passing along the harmonization path at a given time. Only after a decision has finally been performed along the harmonization path, a new cycle may be useful and may thus be triggered.

Figure 14:
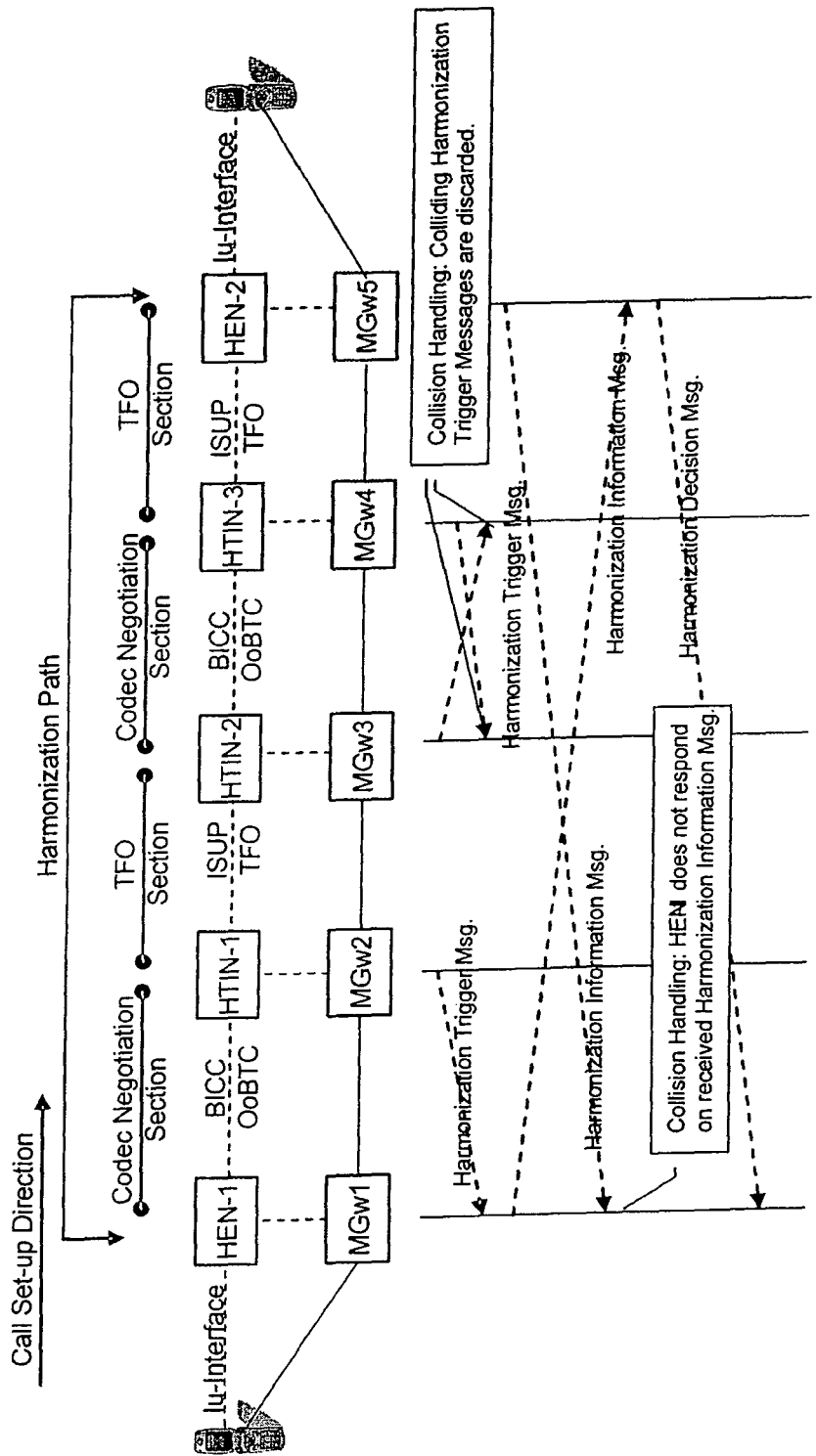
FIG. 14 is a schematic illustration of a third embodiment of a harmonization procedure.

FIG. 14 is a schematic illustration of a further embodiment 620 of a harmonization procedure. In this example, an edge node HEN-1 controls a codec negotiation section and a radio interface, whereas the opposite edge node HEN-2 controls a TFO section and another radio interface. The harmonization path comprises two TFO sections. It is assumed that TFO cannot be established in both TFO sections because the respective TFO partners offer incompatible codecs. Three harmonization trigger messages are thus submitted in this embodiment. A fourth harmonization trigger remains inside the edge node HEN-2, leading HEN-2 to sending a harmonization trigger message without having received an external trigger message. Colliding trigger messages are discarded in the transfer nodes HTIN-2, HTIN-3 due to corresponding collision rules of the harmonization procedure. Both edge nodes transmit harmonization information messages. The upstream edge HEN-1 discards the received harmonization information message and only the downstream edge node decides over the selected codec for the harmonization path. In other embodiments, harmonization trigger messages may be sent only backwards, such that the number of messages and corresponding collisions may be smaller.

Figure 15:
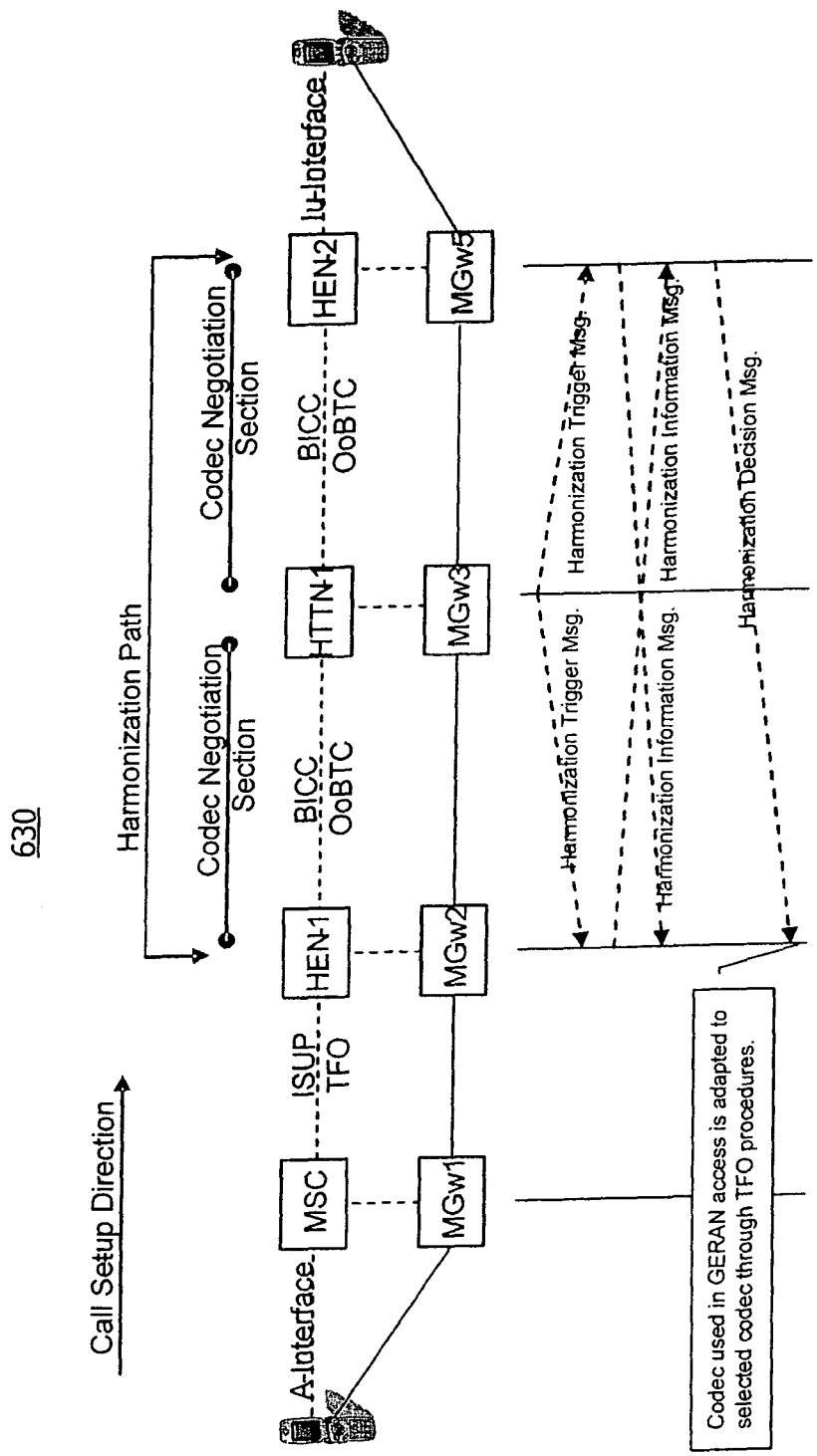
FIG. 15 is a schematic illustration of a fourth embodiment of a harmonization procedure.

FIG. 15 schematically illustrates a fourth embodiment 630 of a harmonization procedure. In this example the harmonization path is shorter than the call path in the core network due to legacy equipment MSC/MGW1. The call control node HEN-1 determines that it is an edge node, because it controls a codec negotiation section and a TFO section with a SysID="GSM" coming directly via TFO from the A-Interface: The TFO partner serving the A-interface (MSC) has sent to HEN-1—for example during a TFO negotiation procedure—the system ID indicating a GSM system. This indicates to HEN-1 that the TFO section may not be enabled to transport harmonization signalling information.

In the example 630, it is further assumed that the transfer node HTTN-1 controls different codecs in the two sections controlled by HTTN-1, although both are codec negotiation sections. Such a configuration may for example result from a codec negotiation procedure, which has been interrupted during call setup due to the fact that HTTN-1 had to play an announcement. Then codec negotiation terminates early and is only continued after the announcement has been played. In the next call segment the already selected codec may not be available and so different codecs may be selected by the two negotiation procedures before and after the interrupt. In this case a harmonization procedure has to be performed to harmonize the speech codecs along the harmonization path, although only a single local codec establishment procedure along the harmonization path is used.

HTTN1 detects the codec mismatch, when it gets the answer to the codec negotiation from HEN2. It then sends harmonization trigger messages in both directions to start the harmonization. In an alternative embodiment, HTTN1 sends only one trigger message, e.g. backwards.

It is further to be noted that the edge node HEN-1 does not directly control the codec used in the GERAN (GSM/Edge RAN) access over the A-interface, because this is controlled by the MSC and a BSC (not shown). However, HEN-1 may initiate a TFO codec optimisation procedure after having received the harmonization decision message to indirectly influence the codec selection via the air interface.

Figure 16:
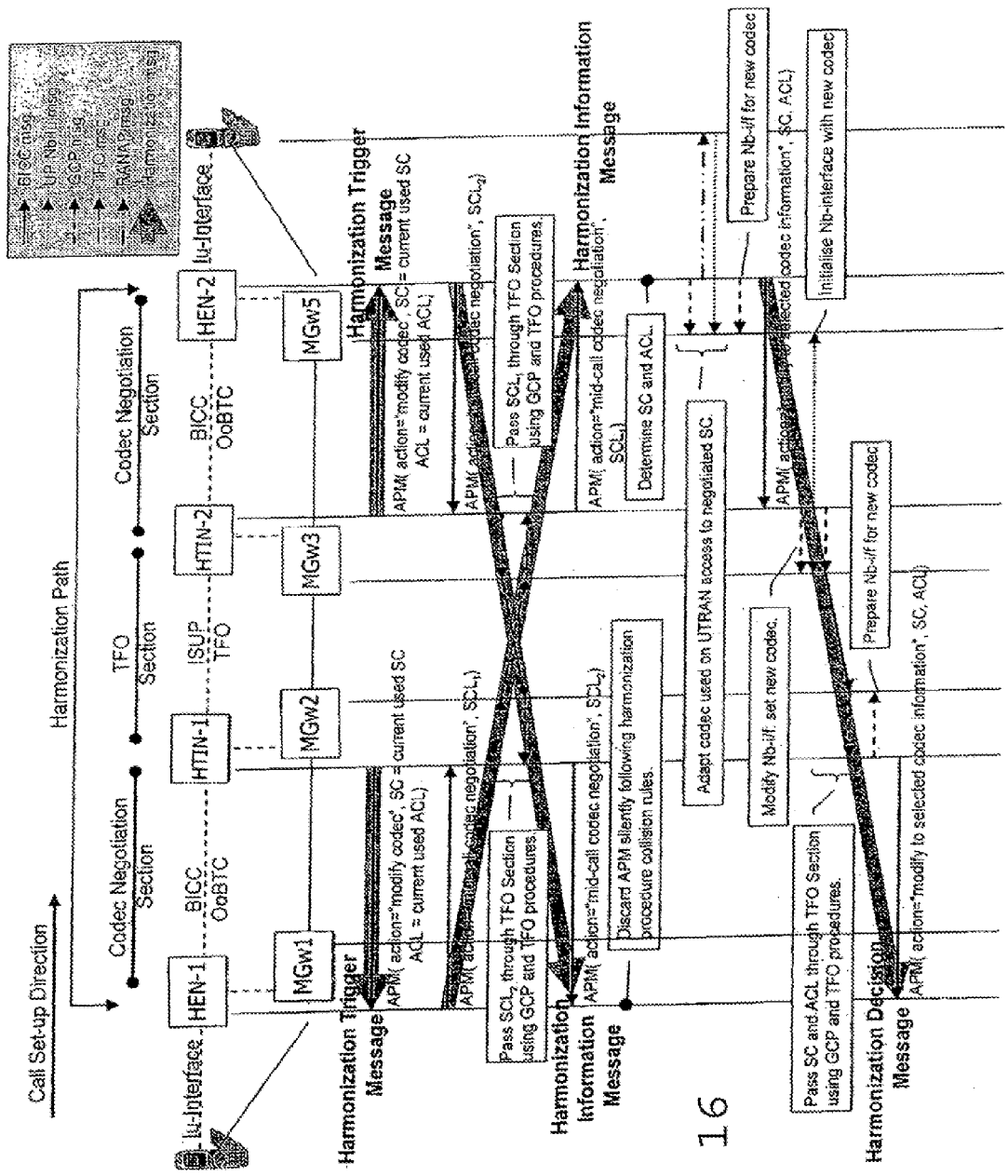
FIGS. 16, 17 are a schematic illustration of a fifth embodiment of a harmonization procedure.
Figure 17:
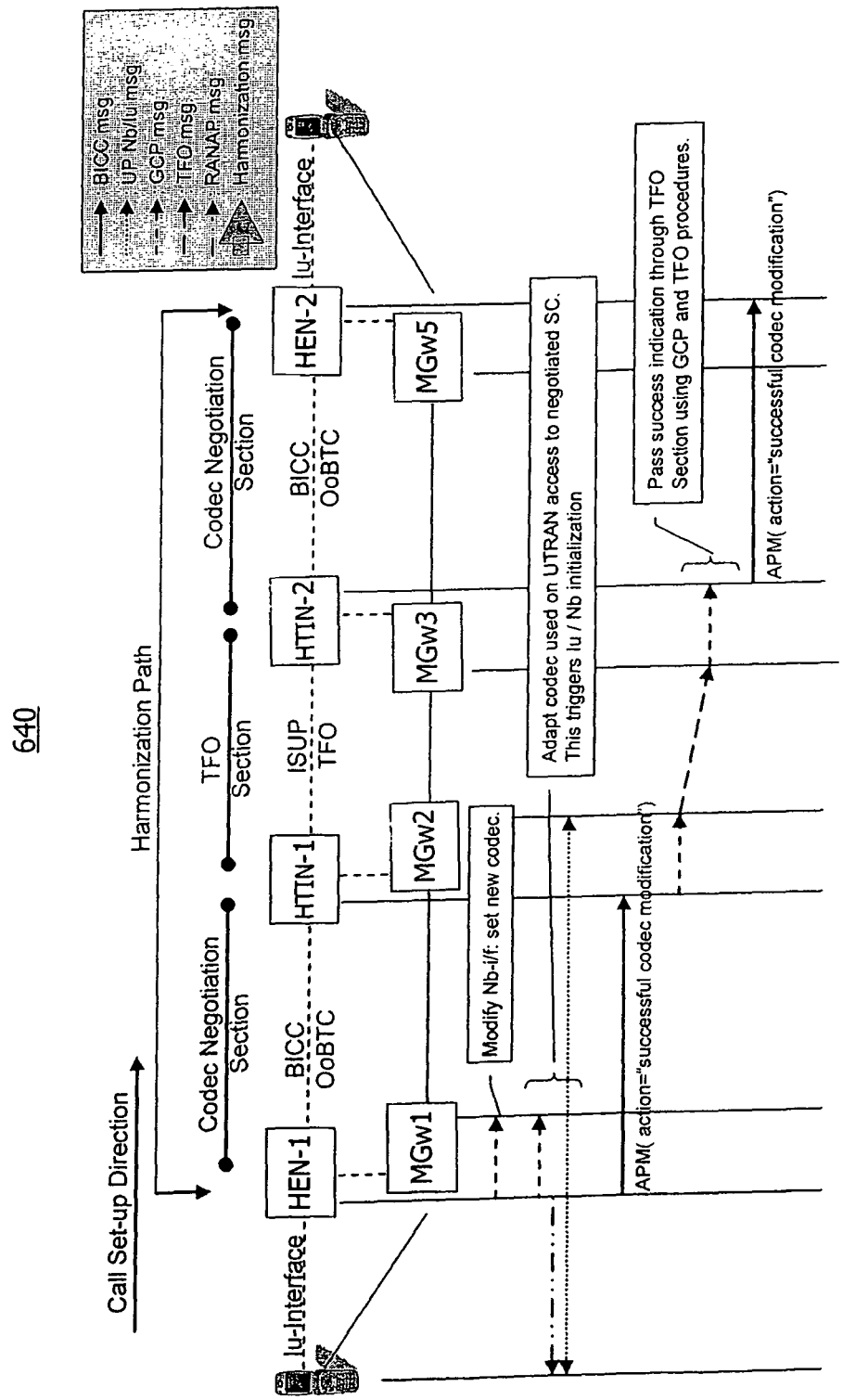

FIGS. 16 and 17 schematically illustrate a fifth example embodiment 640 of a harmonization procedure. In this example the transport of harmonization messages by re-using BICC messages is illustrated in more detail.

Generally, any protocol used in a local codec establishment procedure may be re-used for the harmonization procedures, as long as the protocol supports mid-call codec negotiation or a similar codec announcement mechanism (e.g., TFO negotiation). When re-using such a protocol, harmonization signalling information (transported in signalling messages or otherwise) has to be identified. Harmonization messages, for example, may be identified by adding a specific dummy codec to a codec list. This mechanism works also for transporting harmonization messages in the user plane, e.g. via TFO sections. Alternatively or additionally, specific information elements or specific messages may be defined within the framework of a protocol.

Regarding specifically the codec negotiation protocol BICC, the BICC mid-call modification message may be re-used as harmonization trigger message. As illustrated in FIG. 16, an APM (Application Transport Mechanism) message with action indication set to 'modify codec' may be used for this purpose. The currently used selected codec and available codec list may be included in this message. Since in this example the indicated selected codec is the currently used codec, there will be no effect on the user plane, i.e. no mid call modification will be performed.

As a harmonization information message, a mid-call negotiation message with action indication set to 'mid-call codec negotiation' and including a supported codec list may be used by the sending HEN and the forwarding and filtering HTNs. Further, as harmonization decision message, a mid-call negotiation message with action indication set to 'modify to selected codec information' and indicating the selected codec may be used by the sending HEN and the forwarding and acting HTNs. Optionally an available codec list may also be included in the message. In case a HTN receives a mid-call negotiation message with action indication set to 'mid-call codec negotiation', it shall filter and forward it, but shall not respond to it until it receives the harmonization decision message from the opposite direction.

When a HTN receives and forwards a mid-call negotiation message with action indication set to 'modify to selected codec information', then it shall prepare a bearer for codec modification according to the OoBTC BICC procedure. In case a HEN or a HTN receives a mid-call negotiation message with action indication set to 'modify to selected codec information', then it shall act on it according to the corresponding OoBTC procedure. HEN and HTN shall, however, not follow the collision handling rules defined in the OoBTC procedures, but shall follow collision handling as prescribed for the harmonization procedure.

As another example, the SIP protocol may also be re-used for transporting harmonization signalling messages. For that purpose, the sub-protocol SDP (Session Description Protocol) of SIP may be used, which provides a two-way Offer/Answer-procedure for codec negotiation similar to OoBTC. An SDP OFFER message may be re-used as a harmonization trigger message along a codec negotiation section. An INVITE message including SDP-OFFER may be re-used as harmonization information message by a HEN or HTN. An ANSWER message may be re-used as harmonization decision message. The ANSWER message may include a list of available codecs, wherein, e.g., the first element in the list is the selected codec for the harmonization path.

The technique described herein proposes to distinguish between the point where the harmonization procedure is triggered and the point where the harmonization procedure is actually started. Whereas any of the elements or nodes along the harmonization path may trigger the procedure, the harmonization starting point is always an edge node of the harmonization path. The triggering node determines a requirement for optimizing a used codec. The triggering node does, however, not initiate the harmonization itself, except it is itself an edge node. The harmonization starting point initiates the passing of a supported codec list along the entire harmonization path. This prescription allows avoiding possibly suboptimal and unstable behaviour resulting from several optimization procedures performed independently of each other along the call path.

The technique proposed herein provides a fast and stable codec harmonization for speech or other content data, in which a globally optimized codec (or several codecs) are established along the harmonization path. The proposed technique allows codec harmonization also in complex call cases, which for example involve multiple networks. The proposed technique may be implemented in an easy and cost-efficient way by re-using existing call control protocols or user-plane codec establishment procedures.

While the current invention has been described in relation to its preferred embodiments, it is to be understood that this disclosure is for illustrative purposes only. Accordingly, it is intended that the invention be limited only by the scope of the claims appended hereto.

What is claimed is:

1. A method of operating a call control node controlling at least one section of a call path, wherein the call path includes between two opposite edge nodes a multi-section harmonization path along which codec selection is to be harmonized, and wherein the call control node is a transfer node in the harmonization path between the edge nodes, the method comprising the following steps:
   determining if the call control node is a transfer node of the harmonization path,
   determining if a codec used for the at least one section controlled by the call control node fulfills a predefined harmonization criterion; and
   providing, in case the codec does not fulfill the harmonization criterion, a harmonization trigger indication towards at least one of the edge nodes of the harmonization path for initiating harmonization.

2. The method according to claim 1, comprising the step of determining if the call control node is the transfer node by assessing if the call control node controls two sections of the harmonization path.

3. The method according to claim 1, wherein the harmonization trigger indication is transmitted to a next node in the harmonization path.

4. The method according to claim 1, comprising the further steps of
receiving the harmonization trigger indication from another transfer node in the harmonization path; and
forwarding the harmonization trigger indication further along the harmonization path.

5. The method according to claim 1, comprising the further steps of:
receiving a supported codec list;
modifying the supported codec list by removing a codec indication from the supported codec list in case an indicated codec is not supported by the call control node; and
forwarding a modified supported codec list.

6. The method according to claim 1, comprising the further steps of:
receiving a selected codec indication representing an indicated codec; and
changing, in case a codec used in the at least one section controlled by the call control node is not at least compatible with the indicated codec, the codec to the indicated codec.

7. The method according to claim 1, wherein the harmonization criterion is not fulfilled when a codec used in a first of the at least one section controlled by the call control node is not compatible with a codec used in a second of the at least one section controlled by the call control node.

8. The method according to claim 1, wherein the step of determining if the codec fulfills the harmonization criterion includes determining if a transcoder free operation or a tandem free operation has been established in the at least one section controlled by the call control node.

9. The method according to claim 1, wherein the call control node controls codec negotiation in a first section in a call control layer and controls codec negotiation in a second section in a user plane layer; and
the method comprising the further step of passing at least one of the harmonization trigger indication, a supported codec list, a selected codec indication and an available codec list between the call control layer and the user plane layer.

10. A method of operating a call control node controlling at least one section of a call path, wherein the call path includes between two opposite edge nodes a mufti-section harmonization path along which codec selection is to be harmonized, and wherein the call control node is one of the edge nodes of the harmonization path, the method comprising the following steps:
determining if the call control node is an edge node of the harmonization path;
receiving a harmonization trigger indication from a transfer node in the harmonization path between the edge nodes; and
transmitting, in response to the harmonization trigger indication and in case the call control node is the edge node, a supported codec list towards an opposite edge node of the harmonization path.

11. The method according to claim 10, wherein the step of determining if the call control node is the edge node comprises assessing if the call control node controls exactly one section of the harmonization path.

12. The method according to claim 10, wherein the supported codec list is transmitted to a next node in the harmonization path.

13. The method according to claim 10, comprising the further steps of:
determining if a codec used for the at least one section controlled by the call control node fulfils a predefined harmonization criterion; and
providing, in case the codec does not fulfill the harmonization criterion, the harmonization trigger indication for initiating harmonization.

14. The method according to claim 13, wherein the harmonization criterion is not fulfilled when the codec used for the at least one section controlled by the call control node is not compatible with a codec used for a radio access served by the call control node.

15. The method according to claim 10, the method comprising the further steps of:
receiving a selected codec indication;
changing, in case a codec used in the at least one section of the harmonization path controlled by the call control node is not at least compatible with a codec indicated by the selected codec indication, the codec used in the at least one section of the harmonization path controlled by the call control node to the codec indicated by the selected codec indication; and/or
changing, in case a codec used in a radio access served by the call control node is not at least compatible with the codec indicated by the selected codec indication, the codec used in the radio access served by the call control node to a codec at least compatible to the codec indicated by the selected codec indication.

16. A method of operating a call control node controlling at least one section of a call path, wherein the call path includes between two opposite edge nodes a multi-section harmonization path along which codec selection is to be harmonized, and wherein the call control node is one of the edge nodes of the harmonization path, the method comprising the following steps:
determining if the call control node is an edge node of the harmonization path;
receiving a supported codec list transmitted from an opposite edge node of the harmonization path in response to a reception of a harmonization trigger indication from a transfer node in the harmonization path between the edge nodes;
selecting, in case the call control node is the edge node, a codec indicated by the supported codec list as the selected codec for the harmonization path; and
transmitting a selected codec indication indicative of the selected codec towards the opposite edge node of the harmonization path.

17. The method according to claim 16, wherein the step of determining if the call control node is the edge node comprises assessing if the call control node controls exactly one section of the harmonization path.

18. The method according to claim 16, wherein the selected codec indication is transmitted to a next node in the harmonization path.

19. The method according to claim 16, comprising the further step of changing, in case a codec used in the at least one section of the harmonization path controlled by the call control node is not at least compatible with the selected codec indicated by the selected codec indication, the used codec to the selected codec indicated by the selected codec indication and/or changing, in case a codec used in a radio access served by the call control node is not at least compatible with the selected codec indicated by the selected codec indication, the codec used in the radio access to a codec at least compatible to the selected codec indicated by the selected codec indication.

20. The method according to claim 16, wherein at least one of the harmonization trigger indication, the supported codec list and the selected codec indication are transmitted based on a protocol of a codec establishment procedure used for codec establishment in the at least one section of the harmonization path controlled by the call control node.

21. The method according to claim 20, wherein a dummy codec indicating the harmonization trigger indication is included in a message constructed according to the protocol.

22. A computer program product comprising program code portions for performing the steps of claim 16 when the computer program product is executed on one or more computing devices.

23. The computer program product of claim 22, stored on a computer readable recording medium.

24. A call control node adapted for controlling at least one section of a call path, wherein the call path includes between two opposite edge nodes a multi-section harmonization path along which codec selection is to be harmonized, and wherein the call control node is a transfer node in the harmonization path between the edge nodes, the call control node comprising a processor and memory configured to cause the call control node to:
- determine if the call control node is a transfer node of the harmonization path;
- determine if a codec used for the at least one section controlled by the call control node fulfils a predefined harmonization criterion; and
- provide, in case the codec does not fulfill the harmonization criterion, a harmonization trigger indication towards at least one of the edge nodes of the harmonization path for initiating harmonization.

25. A call control node adapted for controlling at least one section of a call path, wherein the call path includes between two opposite edge nodes a multi-section harmonization path along which codec selection is to be harmonized, and wherein the call control node is one of the edge nodes of the harmonization path, the call control node comprising a processor and memory configured to cause the call control node to:
- determine if the call control node is an edge node of the harmonization path;
- receive a harmonization trigger indication from a transfer node in the harmonization path between the edge nodes; and
- transmit, in response to the harmonization trigger indication and in case the call control node is the edge node, a supported codec list towards an opposite edge node of the harmonization path.

26. A call control node adapted for controlling at least one section of a call path, wherein the call path includes between two opposite edge nodes a multi-section harmonization path along which codec selection is to be harmonized, and wherein the call control node is one of the edge nodes of the harmonization path, the call control node comprising a processor and memory configured to cause the call control node to:
- determine if the call control node is an edge node of the harmonization path;
- receive a supported codec list transmitted from an opposite edge node of the harmonization path in response to a reception of a harmonization trigger indication from a transfer node in the harmonization path between the edge nodes;
- select, in case the call control node is the edge node, a codec indicated by the supported codec list as the selected codec for the harmonization path; and
- transmit a selected codec indication indicative of the selected codec towards the opposite edge node of the harmonization path.

* * * * *